US012481976B2

(12) United States Patent
Jayaraman

(10) Patent No.: US 12,481,976 B2
(45) Date of Patent: Nov. 25, 2025

(54) ENCODED TRANSFER INSTRUMENTS

(71) Applicant: Truist Bank, Charlotte, NC (US)

(72) Inventor: Barath Jayaraman, Fort Mill, SC (US)

(73) Assignee: TRUIST BANK, Charlotte, NC (US)

( * ) Notice: Subject to any disclaimer, the term of this patent is extended or adjusted under 35 U.S.C. 154(b) by 257 days.

(21) Appl. No.: 18/192,761

(22) Filed: Mar. 30, 2023

(65) Prior Publication Data

US 2024/0330895 A1 Oct. 3, 2024

(51) Int. Cl.
| | | |
|---|---|---|
| *G06Q 20/32* | (2012.01) | |
| *G06F 9/451* | (2018.01) | |
| *G06F 16/23* | (2019.01) | |
| *G06F 21/53* | (2013.01) | |
| *G06Q 20/04* | (2012.01) | |
| *G06Q 20/10* | (2012.01) | |
| *G06Q 20/30* | (2012.01) | |
| *G06Q 20/34* | (2012.01) | |
| *G06Q 20/36* | (2012.01) | |
| *G06Q 20/38* | (2012.01) | |
| *G06Q 20/40* | (2012.01) | |
| *G06Q 40/06* | (2012.01) | |
| *G06T 7/10* | (2017.01) | |
| *H04L 9/32* | (2006.01) | |
| *H04L 29/06* | (2006.01) | |
| *H04W 12/06* | (2021.01) | |

(Continued)

(52) U.S. Cl.
CPC ....... *G06Q 20/3274* (2013.01); *G06Q 20/042* (2013.01); *G06Q 20/401* (2013.01); *G06T 7/10* (2017.01); *G06T 2207/20084* (2013.01)

(58) Field of Classification Search
CPC ............. G06Q 20/3274; G06Q 20/042; G06Q 20/401; G06Q 20/3223; G06Q 20/3821; G06Q 20/38215; G06Q 20/3827; G06Q 20/0425; G06T 7/10; G06T 2207/20084
See application file for complete search history.

(56) References Cited

U.S. PATENT DOCUMENTS

| | | | |
|---|---|---|---|
| 5,726,435 A | * 3/1998 | Hara | ................ G06K 7/1417 235/494 |
| 7,207,481 B2 | 4/2007 | Barenburg et al. | |

(Continued)

OTHER PUBLICATIONS

D. Blank, "Barcode Labels: How Do 2D Barcodes Compare to QR Codes? Does it Matter?," Feb. 6, 2023, barcoding.com, retrieved from: https://web.archive.org/web/20230206004616/https://www.barcoding.com/blog/barcode-labels-how-do-2d-barcodes-compare-to-qr-codes-does-it-matter (Year: 2023).*

(Continued)

*Primary Examiner* — Jessica Lemieux
*Assistant Examiner* — Douglas W Pinsky
(74) *Attorney, Agent, or Firm* — Michael A. Springs, Esq.; Shumaker, Loop & Kendrick, LLP; Patrick B. Horne

(57) ABSTRACT

Disclosed are systems and methods for generating encoded instruments that implement electronic transfers. The system converts instruments to an electronic format using an imaging source or optical code detection device. The image data is processed to decode encoded components of the image data and to determine content elements and segments of the electronic transfer instrument and to extract transfer data. The transfer data is validated to facilitate secure, accurate execution of the electronic transfer.

16 Claims, 7 Drawing Sheets

(51) Int. Cl.

| | | |
|---|---|---|
| *H04W 12/08* | (2021.01) | |
| *G06F 21/31* | (2013.01) | |
| *G06F 21/32* | (2013.01) | |
| *G06F 21/45* | (2013.01) | |
| *G06F 21/57* | (2013.01) | |
| *G06Q 40/02* | (2023.01) | |
| *H04W 4/14* | (2009.01) | |
| *H04W 12/062* | (2021.01) | |
| *H04W 12/72* | (2021.01) | |
| *H04W 60/00* | (2009.01) | |

(56) References Cited

U.S. PATENT DOCUMENTS

| | | |
|---|---|---|
| 8,292,178 B2 | 10/2012 | Chaves |
| 8,708,227 B1 | 4/2014 | Oakes, III et al. |
| 10,489,439 B2 | 11/2019 | Calapodescu et al. |
| 10,552,810 B1 | 2/2020 | Ethington et al. |
| 11,295,377 B1 * | 4/2022 | Ethington .............. G06V 10/44 |
| 2007/0156438 A1 * | 7/2007 | Popadic ................. G06Q 40/00 |
| | | 229/71 |
| 2010/0260408 A1 | 10/2010 | Prakash et al. |
| 2016/0292486 A1 | 10/2016 | Prusik et al. |
| 2019/0244180 A1 * | 8/2019 | Davies .................... G06V 30/40 |
| 2023/0077271 A1 * | 3/2023 | Kolchin ............... G06Q 20/389 |

OTHER PUBLICATIONS

Truist Bank; Inventor Raphael Fitzgerald; U.S. Appl. No. 17/815,706, filed Jul. 28, 2022. Title: Method for Identifying Handwritten Characters on an Image Using a Classification Model.

Muhammad Mahbubur Rahman and Tim Finin; Deep Understanding of a Document's Structure; @ 2017 Copyright held by the owner/author(s). ISBN 978-1-4503-5549-0/17/12 DOI: https://doi.org/10.1145/3148055.3148080; 11 pages.

* cited by examiner

ENCODED TRANSFER INSTRUMENTS

TECHNICAL FIELD AND BACKGROUND

The present invention relates generally to the field of generating and reading encoded transfer instruments.

Conventional techniques for resource transfers require manually generating, reviewing, and approving transfer instruments before sending the transfer instrument to a remote entity for processing. Inconsistencies or errors in a transfer instrument are often not detected until days later after the transfer instrument has been sent to the remote entity. The errors and inconsistencies can cause the electronic transfer to fail such that it must be performed again. Repeating the electronic transfer might not be possible if the transfer source and the transfer target, or destination, are not in communication. Conventional techniques also expose sensitive elements of data included within the transfer instrument as human readable characters that could be copied and used to generate unauthorized transfers.

To address the drawbacks of conventional techniques, the present systems and methods generate electronic transfer instruments that can include encoded information that is not human-readable so that sensitive information is less susceptible to interception. The systems utilize imaging devices to automatically read and record encoded and non-encoded data from transfer instruments. The data recorded from the transfer instruments can in turn be used to generate electronic, digitized transfer instruments. The transfer instruments can be automatically validated, scanned for errors or inconsistencies, or corrected in real time before sending the transfer instrument to a remote entity. The result is an efficient, secure, automated process for initiating electronic transfers.

SUMMARY

The system generates transfer instruments in hardcopy or electronic format that included encoded, non-human readable transfer data used to implement an underlying resource transfer. The transfer data can be encoded, for example, as a Quick Response ("QR") code, a hologram, a conventional bar code, using an encryption key, or other means for optically encoding data. The transfer instruments are read and recorded using image data captured by an imaging device, such as a camera or scanner. The image data can be captured, stored to a database, and/or transmitted to a remote device for subsequent processing according to the systems and methods disclosed below. The image data can also be read to determine the underlying transfer data that is appended to the image data, reformatted, and/or used to create an electronic transfer instrument sent to a remote device for subsequent processing.

BRIEF DESCRIPTION OF THE DRAWINGS

Features, aspects, and advantages of the present invention are better understood when the following detailed description of the invention is read with reference to the accompanying figures, in which.

DETAILED DESCRIPTION

Figure 1:
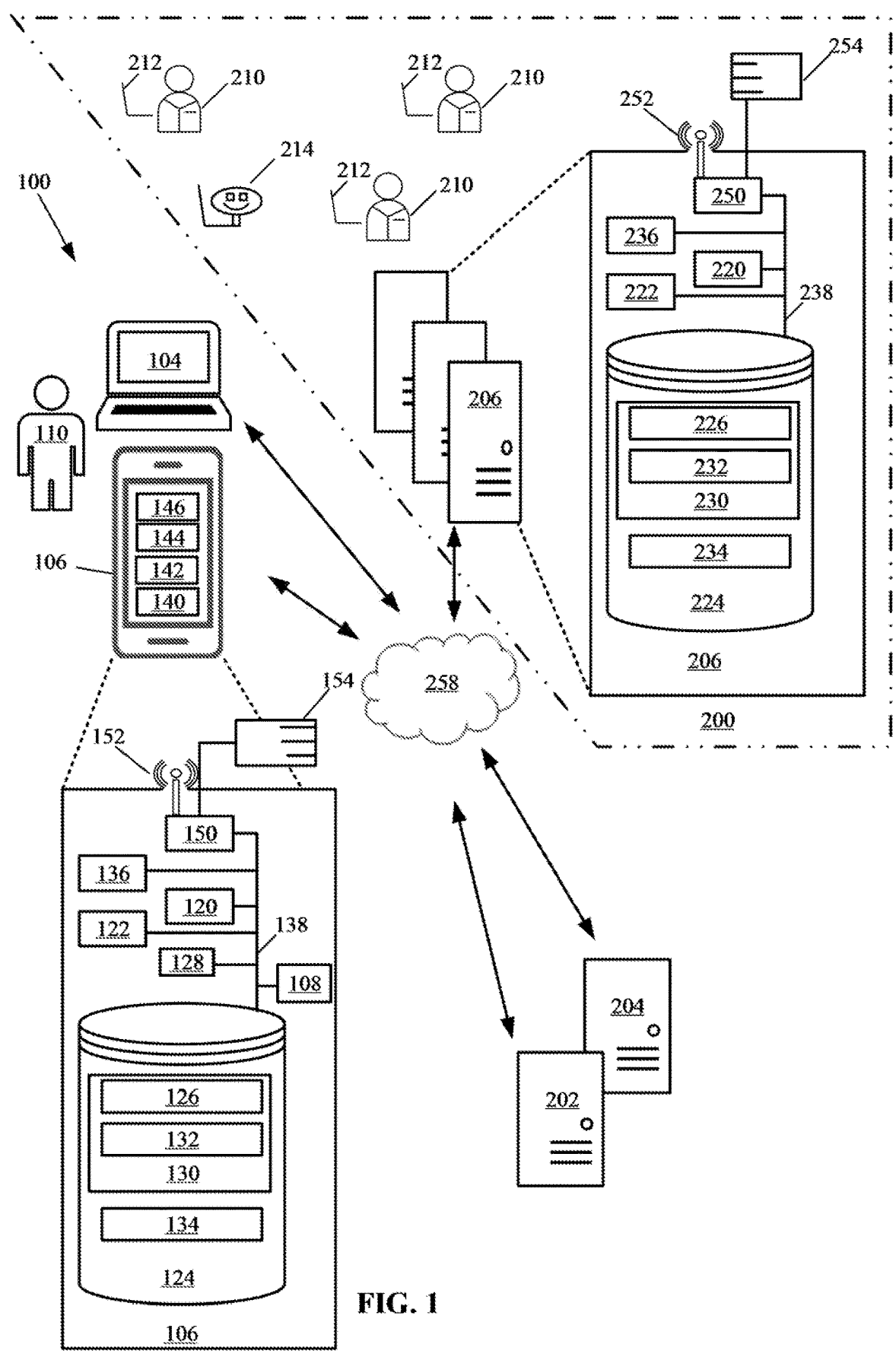
FIG. 1 is an example system diagram according to one embodiment.

The present invention will now be described more fully hereinafter with reference to the accompanying drawings in which example embodiments of the invention are shown. However, the invention may be embodied in many different forms and should not be construed as limited to the representative embodiments set forth herein. The example embodiments are provided so that this disclosure will be both thorough and complete and will fully convey the scope of the invention and enable one of ordinary skill in the art to make, use, and practice the invention. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole (as would be appreciated by one of ordinary skill in the art).

The terms "coupled," "fixed," "attached to," "communicatively coupled to," "operatively coupled to," and the like refer to both: (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

As used herein, the terms "enterprise" or "provider" generally describes a person or business enterprise that hosts, maintains, or uses the disclosed systems and methods. The term provider generally describes the person or business enterprise providing goods or services. The term "user" is used interchangeably with the terms end user, customer, or consumer, and these terms represent individuals to whom a provider is rendering goods or services or individuals and/or with whom the provider has an ongoing relationship.

The term electronic augmentation is used synonymously with the terms "virtual endorsement," or "virtual marking," and the term includes an electronic signature or other information used to securely authorize an electronic transfer as well as instructions used to process the electronic transfer. The term transfer instrument denotes a tangible or intangible record that includes information required to authorize and institute an electronic transfer, as discussed more fully below.

Embodiments are described with reference to flowchart illustrations or block diagrams of methods or apparatuses where each block or combinations of blocks can be implemented by computer-readable instructions (i.e., software). The term "apparatus" includes systems and computer program products. The referenced computer-readable software instructions may be provided to a processor of a general purpose computer, special purpose computer, or other programmable data processing apparatus to produce a particular machine. The instructions, which execute via the processor of the computer or other programmable data processing apparatus, create mechanisms for implementing the functions specified in this specification and attached figures.

The computer-readable instructions are loaded onto a computer or other programmable data processing apparatus to cause a series of operational steps to be performed on the computer or other programmable apparatus to produce a computer-implemented process such that the instructions, which execute on the computer or other programmable apparatus, provide steps for implementing the functions specified in the attached flowchart(s) or block diagram(s). Alternatively, computer software implemented steps or acts may be combined with operator or human implemented steps or acts in order to carry out an embodiment of the disclosed systems and methods.

The computer-readable software instructions may also be stored in a computer-readable memory that can direct a computer or other programmable data processing apparatus to function in a particular manner. In this manner, the instructions stored in the computer-readable memory produce an article of manufacture that includes the instructions, which implement the functions described and illustrated herein.

System Level Description

As shown in FIG. 1, a hardware system 100 configuration according to one embodiment generally includes a user 110 that benefits through use of services and products offered by a provider through an enterprise system 200. The user 110 accesses services and products by use of one or more user computing devices 104 & 106. The user computing device can be a larger device, such as a laptop or desktop computer 104, or a mobile computing device 106, such as smart phone or tablet device with processing and communication capabilities. The user computing device 104 & 106 includes integrated software applications that manage device resources, generate user interfaces, accept user inputs, and facilitate communications with other devices, among other functions. The integrated software applications can include an operating system, such as Linux®, UNIX®, Windows®, macOS®, iOS®, Android®, or other operating system compatible with personal computing devices.

The user 110 can be an individual, a group, or an entity having access to the user computing device 104 & 106. Although the user 110 is singly represented in some figures, at least in some embodiments, the user 110 is one of many, such as a market or community of users, consumers, customers, business entities, government entities, and groups of any size.

The user computing device includes subsystems and components, such as a processor 120, a memory device 122, a storage device 124, or power system 128. The memory device 122 can be transitory random access memory ("RAM") or read-only memory ("ROM"). The storage device 124 includes at least one of a non-transitory storage medium for long-term, intermediate-term, and short-term storage of computer-readable instructions 126 for execution by the processor 120. For example, the instructions 126 can include instructions for an operating system and various integrated applications or programs 130 & 132. The storage device 124 can store various other data items 134, including, without limitation, cached data, user files, pictures, audio and/or video recordings, files downloaded or received from other devices, and other data items preferred by the user, or related to any or all of the applications or programs.

The memory device 122 and storage device 124 are operatively coupled to the processor 120 and are configures to store a plurality of integrated software applications that comprise computer-executable instructions and code executed by the processing device 120 to implement the functions of the user computing device 104 & 106 described herein. Example applications include a conventional Internet browser software application and a mobile software application created by the provider to facilitate interaction with the provider system 200.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The integrated software applications also typically provide a graphical user interface ("GUI") on the user computing device display screen 140 that allows the user 110 to utilize and interact with the user computing device. Example GUI display screens are depicted in the attached figures. The GUI display screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions.

The processing device 120 performs calculations, processes instructions for execution, and manipulates information. The processing device 120 executes machine-readable instructions stored in the storage device 124 and/or memory device 122 to perform methods and functions as described or implied herein. The processing device 120 can be implemented as a central processing unit ("CPU"), a microprocessor, a graphics processing unit ("GPU"), a microcontroller, an application-specific integrated circuit ("ASIC"), a programmable logic device ("PLD"), a digital signal processor ("DSP"), a field programmable gate array ("FPGA"), a state machine, a controller, gated or transistor logic, discrete physical hardware components, and combinations thereof. In some embodiments, particular portions or steps of methods and functions described herein are performed in whole or in part by way of the processing device 120. In other embodiments, the methods and functions described herein include cloud-based computing such that the processing device 120 facilitates local operations, such communication functions, data transfer, and user inputs and outputs.

or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

The user computing device 104 & 106 may also include a positioning device 108, such as a global positioning system device ("GPS") that determines a location of the user computing device. In other embodiments, the positioning device 108 includes a proximity sensor or transmitter, such as an RFID tag, that can sense or be sensed by devices proximal to the user computing device 104 & 106.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

A system intraconnect 138, such as a bus system, connects various components of the mobile device 106. The user computing device 104 & 106 further includes a communication interface 150. The communication interface 150 facilitates transactions with other devices and systems to provide two-way communications and data exchanges through a wireless communication device 152 or wired connection 154. Communications may be conducted via various modes or protocols, such as through a cellular network, wireless communication protocols using IEEE 802.11 standards. Communications can also include short-range protocols, such as Bluetooth® or Near-field communication ("NFC") protocols. Communications may also or alternatively be conducted via the connector 154 for wired connections such by universal serial bus ("USB"), Ethernet, and other physically connected modes of data transfer.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210 act on behalf of the provider, such as customer service representatives, advisors, managers, and sales team members.

Human agents 210 utilize agent computing devices 212 to interface with the provider system 200. The agent computing devices 212 can be, as non-limiting examples, computing devices, kiosks, terminals, smart devices such as phones, and devices and tools at customer service counters and windows at POS locations. In at least one example, the diagrammatic representation and above-description of the components of the user computing device 104 & 106 in FIG. 1 applies as well to the agent computing devices 212. As used herein, the general term "end user computing device" can be used to refer to either the agent computing device 212 or the user computing device 110 depending on whether the agent (as an employee or affiliate of the provider) or the user (as a customer or consumer) is utilizing the disclosed systems and methods to segment, parse, filter, analyze, and display content data.

Human agents 210 interact with users 110 or other agents 212 by phone, via an instant messaging software application, or by email. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components, such as a processor device 220, an input-output system 236, an intraconnect bus system 238, a communication interface 250, a wireless device 252, a hardwire connection device 254, a transitory memory device 222, and a non-transitory storage device 224 for long-term, intermediate-term, and short-term storage of computer-readable instructions 226 for execution by the processor device 220. The instructions 226 can include instructions for an operating system and various software applications or programs 230 & 232. The storage device 224 can store various other data 234, such as cached data, files for user accounts, user profiles, account balances, and transaction histories, files downloaded or received from other devices, and other data items required or related to the applications or programs 230 & 232.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations.

The network 258 may be or include an enterprise or secured network, or may be implemented, at least in part, through one or more connections to the Internet. A portion of the network 258 may be a virtual private network ("VPN") or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100.

External systems 270 and 272 represent any number and variety of data sources, users, consumers, customers, enterprises, and groups of any size. In at least one example, the external systems 270 and 272 represent remote terminal utilized by the enterprise system 200 in serving users 110. In another example, the external systems 270 and 272 represent electronic systems for processing payment transactions. The system may also utilize software applications that function using external resources 270 and 272 available through a third-party provider, such as a Software as a Service ("SasS"), Platform as a Service ("PaaS"), or Infrastructure as a Service ("IaaS") provider running on a third-party cloud service computing device. For instance, a cloud computing device may function as a resource provider by providing remote data storage capabilities or running software applications utilized by remote devices.

SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

The embodiment shown in FIG. 1 is not intended to be limiting, and one of ordinary skill in the art will appreciate that the system and methods of the present invention may be implemented using other suitable hardware or software configurations. For example, the system may utilize only a single computing system 206 implemented by one or more physical or virtual computing devices, or a single computing device may implement one or more of the computing system 206, agent computing device 206, or user computing device 104 & 106.

Artificial Intelligence

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor ("KNN"), and the like. Additionally or alternatively, the machine learning algorithm may include one or more regression algorithms configured to output a numerical value in response to a given input. Further, the machine learning may include one or more pattern recognition algorithms—e.g., a module, subroutine or the like capable of translating text or string characters and/or a speech recognition module or subroutine. The machine learning modules may include a machine learning acceleration logic (e.g., a fixed function matrix multiplication logic) that implements the stored processes or optimizes the machine learning logic training and interface.

One subfield of machine learning includes neural networks. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

A feedforward network may include a topography with a hidden layer of nodes between an input layer and an output layer. The input layer includes input nodes that communicate input data, variables, matrices, or the like to the hidden layer that is implemented with one or more layers of hidden layer nodes. A first hidden layer generates a representation and/or transformation of the input data into a form that is suitable for generating output data. For network topologies having multiple hidden layers, the outputs of the first hidden layer feed a second layer of hidden nodes and so on until finally feeding the output layer of nodes. Adjacent layers of the topography are connected at the edges of the nodes of the respective layers, but nodes within a layer typically are not separated by an edge.

In at least one embodiment of a feedforward network, data is communicated to the nodes of the input layer, which then communicates the data to the hidden layer. The hidden layer may be configured to determine the state of the nodes in the respective layers and assign weight coefficients or parameters of the nodes based on the edges separating each of the layers. That is, the hidden layer implements activation functions between the input data communicated from the input layer and the output data communicated to the nodes of the output layer. The hidden layers are intermediate the input and output layers and are generally where all or most of the computation is performed.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Supervised learning software systems implement techniques that include, without limitation, Latent Semantic Analysis ("LSA"), Probabilistic Latent Semantic Analysis ("PLSA"), Latent Dirichlet Allocation ("LDA"), and more recent Bidirectional Encoder Representations from Transformers ("BERT").

Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient (e.g., a propagated value). The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

Unsupervised learning software systems can perform training operations on unlabeled data and less requirement for time and expertise from trained data scientists. Unsupervised learning software systems can be designed with integrated intelligence and automation to automatically discover information, structure, and patterns from content data.

Unsupervised learning software systems can be implemented with clustering software techniques that include, without limitation: (i) K-mean clustering; (ii) Mean-Shift clustering; (iii) density based special clustering of applications with noise (e.g., DBSCAN); (iv) spectral clustering; (v) Principal Component Analysis; (vi) Neural Topic Modeling ("NTM"); (vii) expectation maximization (e.g., EM) clustering using Gaussian mixture models (e.g., GMM); (viii) agglomerative hierarchical clustering; (ix) Hopefield Networks; (ix) a Boltzmann Machines; (x) a Sigmoid Belief Net; (xi) Deep Belief Networks; (xii) a Helmholtz Machine; (xiii) a Kohonen Network where each neuron of an output layer holds a vector with a dimensionality equal to the number of neurons in the input layer, and in turn, the number of neurons in the input layer is equal to the dimensionality of data points given to the network; (xiv) a Self-Organizing Map ("SOM") having a set of neurons connected to form a topological grid (usually rectangular) that, when presented with a pattern, the neuron with closest weight vector is considered to be the output with the neuron's weight adapted to the pattern, as well as the weights of neighboring neurons, to naturally find data clusters; and (xv) a Centroid Neural Network that is premised on K-mean clustering software processing techniques.

Clustering software techniques can automatically group similar data together to accelerate the derivation and verification a new classification or subject, and not just classification into an existing subject or classification. In one embodiment, clustering may be performed using a cluster model to group data points based on certain similarities using unlabeled data. Example cluster models may include, for example, connectivity models, centroid models, distribution models, density models, group models, graph based models, neural models and the like.

An additional or alternative type of neural network suitable for use in the machine learning program and/or module is a Convolutional Neural Network ("CNN"). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program.

A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An additional or alternative type of feedforward neural network suitable for use in the machine learning program and/or module is a Recurrent Neural Network ("RNN"). A RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter. That is, at least a portion of the output data from the RNN may be used as feedback or input in calculating subsequent output data. In some embodiments, the machine learning module may include an RNN configured for language processing (e.g., an RNN configured to perform statistical language modeling to predict the next word in a string based on the previous words). The RNN(s) of the machine learning program may include a feedback system suitable to provide the connection(s) between subsequent and previous network layers.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks (e.g., by providing a known input vector, including values for the input variables) and a known output classification. The support vector machine is trained by selecting the support vectors and/or a portion of the input vectors that maximize the determined margin.

Generally, the neural network(s) of the machine learning program may include a relatively large number of layers (e.g., three or more layers) and are referred to as deep neural networks. According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input output transformations and may include, according to various embodiments, a backpropagation algorithm. According to various embodiments, deep neural networks may be configured to classify images of handwritten digits from a dataset or various other images.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression ("LR"), Naive-Bayes, Random Forest ("RF"), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks known to those of skill in the art.

Different neural network architectures can be more particularly suited for particular uses to process different types of data inputs and render specific outputs. For example, different neural network architectures can be better suited to perform natural language processing and topic modeling while other types of neural network architectures are more well suited for predictive modeling of future expected data.

To implement natural language processing technology, for example, suitable neural network architectures can include, without limitation: (i) multilayer perceptron ("MLP") networks having three or more layers and that utilizes a nonlinear activation function (mainly hyperbolic tangent or logistic function) that allows the network to classify data that is not linearly separable; (ii) convolutional neural networks; (iii) recursive neural networks; (iv) recurrent neural networks; (v) LSTM network architecture; (vi) Bidirectional Long Short-Term Memory network architecture, which is an improvement upon LSTM by analyzing word, or communication element, sequences in forward and backward directions; (vii) Sequence-to-Sequence networks; and (viii) shallow neural networks such as word2vec (i.e., a group of shallow two-layer models used for producing word embedding that takes a large corpus of alphanumeric content data as input to produces a vector space where every word or communication element in the content data corpus obtains the corresponding vector in the space).

To perform predictive analysis of expected future values of data, suitable neural network architectures can include various deep-learning techniques and specific architectures that include, but are not limited to: (i) LSTM network architecture; (ii) deep-learning, cyclic recurrent neural networks; (iii) an Elman recurrent neural network; (iv) convolutional neural networks; (v) multilayer perceptron networks; (vi) TensorFlow networks; (vii) MxNet networks; (viii) PyTorch networks; (ix) Keras networks; and (x) Gluon networks.

Recognizing Content Elements and Image Processing

Figure 2:
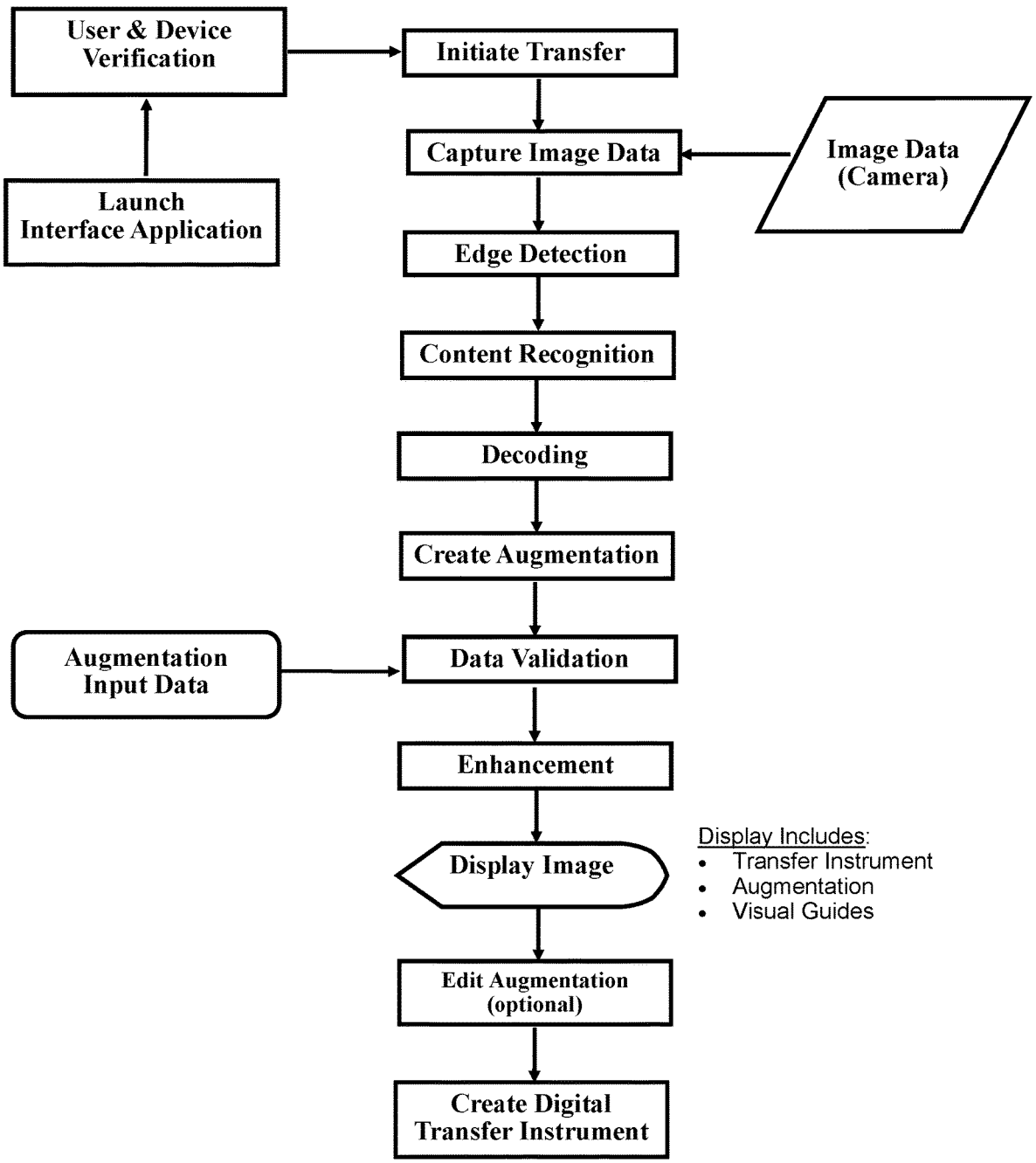
FIG. 2 is an example process according to one embodiment.
Figure 3:
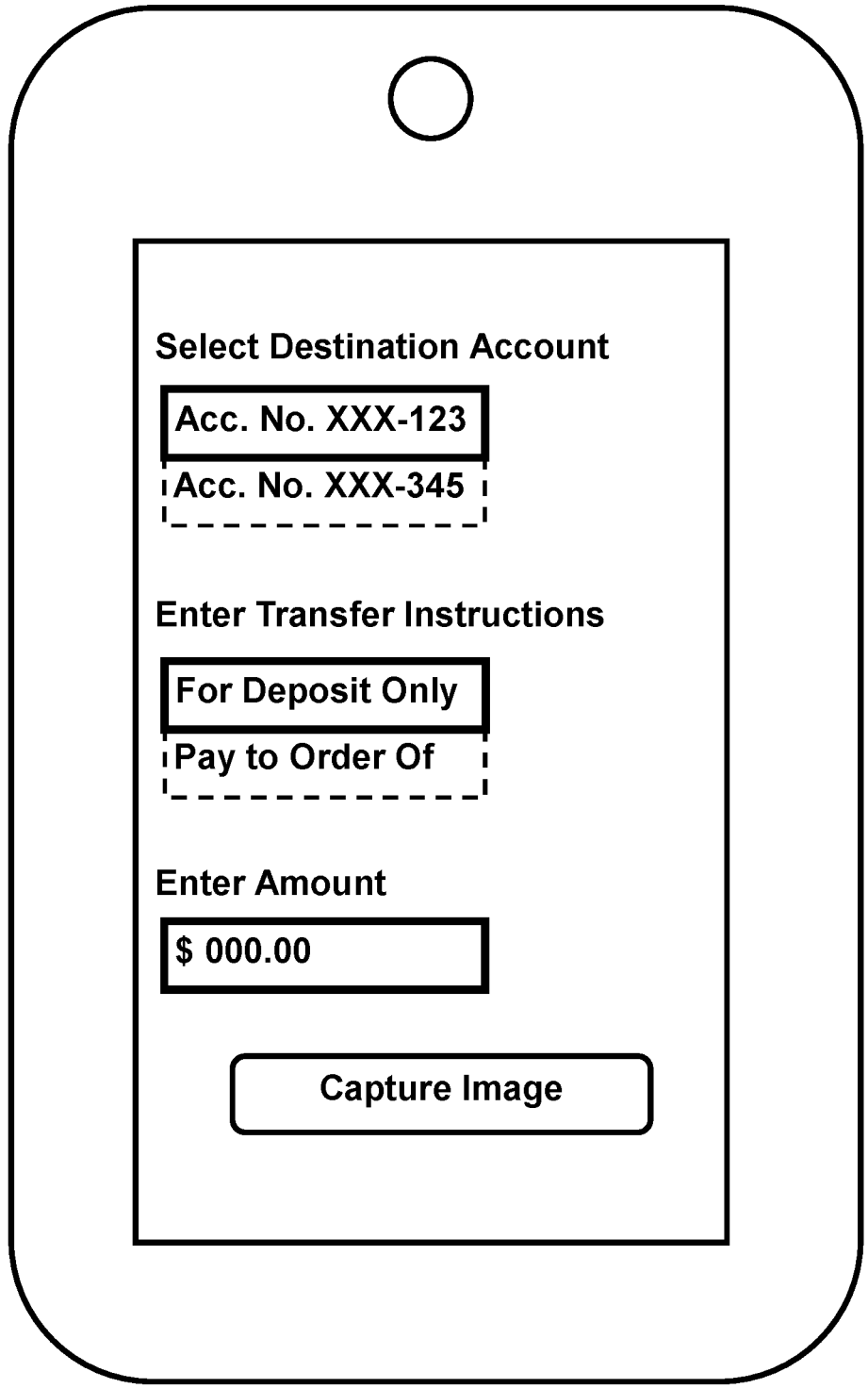
FIG. 3 is an example user interface according to one embodiment.
Figure 4:
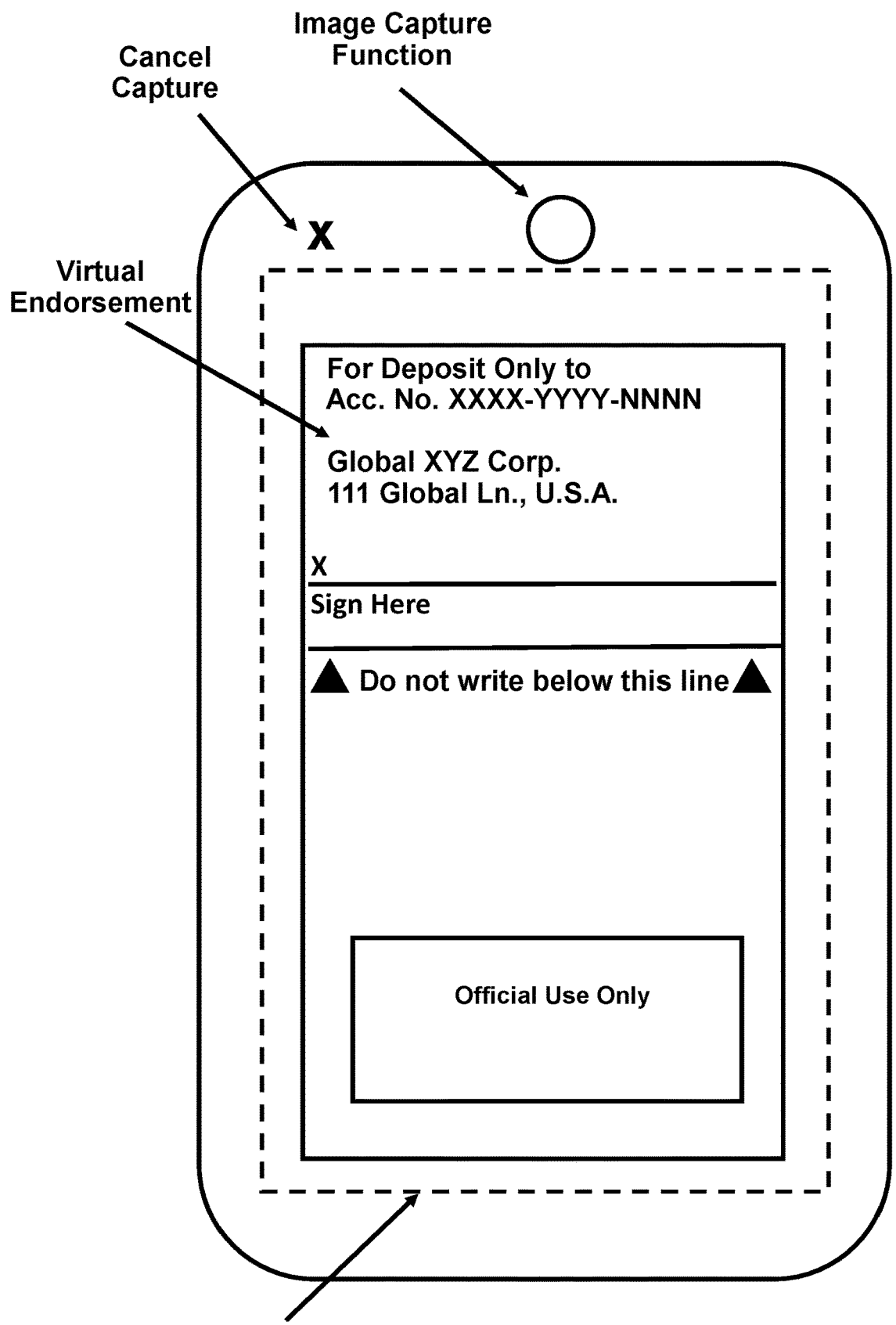
FIG. 4 is an example user interface for image capture and showing electronic augmentations according to one embodiment.

The present systems and methods read, record, and create electronic transfer instruments based on image data captured or generated from a camera, scanner, or other device. An example process flow for capturing image data is shown in FIG. 2 and example interfaces for capturing image data are shown in FIGS. 3 and 4. The image data can be stored in one or more various image formats, such as a Joint Photographic Experts Group ("JPEG") compliant format, a tabbed image file ("TIFF") format, a bitmap format, or a Scalable Vector Graphics ("SVG") image format. In some embodiments, the electronic transfer instrument can be converted to, and stored as, a portable document format ("PDF").

The system processes the image data using a content recognition analysis to determine individual content elements in the data, such as letters, numbers, characters, or symbols. To ensure human and machine readability of the image data, the system can include an Image Processing Module software component integrated with the user computing device or integrated with a provider device that performs one or more image enhancement operations. The enhancement operations can improve the accuracy of content recognition analyses that employs techniques such as edge detection, optical character recognition ("OCR"), intelligent character recognition ("ICR") that uses artificial intelligence techniques to recognize characters, magnetic ink character recognition ("MICR"), courtesy amount recognition ("CAR"), or legal amount recognition ("LAR").

Enhancement operations include, but are not limited to, one or more of the following functions: (i) de-skewing an image where the edges of the transfer instrument are rotated relative to the boundaries of the image (i.e., re-orienting the transfer instrument image to better align with the image boundaries); (ii) de-warping the image when the transfer instrument is tilted or folded such that some portions of the transfer instrument are closer to the camera than other portions (i.e., modifying portions of the transfer instrument image so that the transfer instrument appears to be perpendicular to the camera lens); (iii) binarization to convert the image to black-and-white pixels; (iv) de-speckling to remove positive and negative spots and to smooth edges present in the image; (v) line removal to eliminate non-glyph lines or shapes (i.e., shapes that do not form part of a character, such as inadvertent pen strokes); (vi) cropping pixels or portions of an image outside of the transfer instrument; (vii) down-sizing the image to a more suitable dots-per-square-inch ("DPI") size that is more efficient to process and transmit over a network; (viii) character segmentation to separate individual characters that might be linked by artifacts in an image (e.g., a hand-written cursive word that links characters, a user-inserted hyphen, or a stain or dark spot between characters that appears to improperly connect the characters); (ix) line and word detection; (x) script recognition to detect characters unique to particular fonts or languages that can be more efficiently compared against a known database of characters of the same language or font to identify the characters; and (xi) de-noising an image to reduce abrupt changes in pixel values throughout an image.

With respect to de-skewing, de-warping, and de-speckling operations, the Image Processing Module can employ techniques such as: (i) convex-hull algorithms that create a smooth polygon around the transfer instrument image and remove concavities; or (ii) a rotating calipers algorithm that determines the tightest fitting rectangle around the transfer instrument edges that can be used to determine the orientation angle of the transfer instrument to better align the transfer instrument with the image boundaries.

Following image enhancement operations, the Image Processing Module processes the image data that represents the transfer instrument using a content recognition analysis. The content recognition analysis locates and identifies the human-readable characters on the transfer instrument that form transfer data. The content recognition analysis can employ OCR or ICR processing techniques that generally include two methods: (i) component detection that defines a character by evaluating individual components such as lines and strokes; and (ii) pattern recognition that identifies entire characters. Both OCR and ICR techniques are generally referred to herein as OCR or character recognition techniques.

Content recognition techniques can include both traditional image processing to model-based detection. Image processing-based content recognition methods include Stroke Width Transform ("SWT") and Maximally Stable Extremal Regions ("MSER") that extract text regions based on edge detection and extremal region extraction, respectively. Deep-learning model-based software techniques may include Connectionist Text Proposal Network ("CTPN") and Efficient and Accurate Scene Text Detector ("EAST").

Once the transfer instrument image preprocessed and analyzed to determine constitute components, the content recognition analysis is either applied directly, or a further feature extraction stage may be applied. Deep learning-based solutions combine both feature extraction and content recognition in a single model. For input in the form of images, convolutional neural networks yield suitable results. Due to the sequence nature of text, a combination of Convolutional Neural Networks and bidirectional Long Short-Term Memory based Recurrent Neural Networks can also be applied as a basis for a content recognition software service. The final output of the bidirectional LSTM layers can be fed into Connectionist Temporal Classification ("CTC") layer to convert the sequence into feature vector ready for word classification.

In one embodiment useful for handwritten content recognition, the system groups consecutive strokes recognized in the image data. This results in a component graph where each node corresponds to at least one character hypothesis and where adjacency constraints between characters are handled by the node connections. Nodes are considered adjacent if the corresponding hypotheses have no common stroke but whose strokes are consecutive in the original input data.

The system can include a database of content element character candidates with probabilities or recognition scores for each node of the component graph. These probabilities or recognition scores are based on a content element recognition information database. The content element recognition information database defines all the different characters and symbols of an alphabet underlying to the specified language. This information is language dependent and comprises general differences in alphabets as well as the ability to recognize various individual styles of writing the alphabets.

A first step in content recognition for one example embodiment can be based on a combination of dynamic and static features. The dynamic features can be extracted from the trajectory of the input stroke and are based on information such as position, direction, and curvature of the input stroke. Static features can be extracted from a bitmap representation of the input stroke and can be based on projections and histograms.

A second stage of content recognition can be classification of the features extracted by a pattern classifier such as a neural network. The neural network can be a multilayer perceptron or include an extra class enabling the neural network to reject node hypotheses corresponding to badly segmented characters. The system generates a list of character candidates with probabilities or recognition scores for each node of the segmentation graph. An alternative embodiment might make use of another kind of neural network such as Deep Neural Network, Convolutional Neural Network, or Recurrent Neural Network. Other types of pattern classifiers could be used to address content recognition tasks, such as a support vector machine or a hidden Markov model.

The system generates linguistic meaning for the different paths in the component graph. The system checks candidates according to the content element information available in a database. The content element information can include a lexicon, a regular expressions, or the like. The system processes the image data to find the best recognition path or a recognition path having the lowest cost. Cost can be estimated from the probabilities or recognition scores of each node belonging to a path in the component graph. In one embodiment, the costs are estimated from the neural network probabilities by applying a logarithmic, non-linear function.

In one embodiment, the system does this by exploring a language model such as final state automaton (e.g., a determinist FSA) representing the content of linguistic information. In some embodiments, the system can utilize statistical information modeling for how frequent a word or a given sequence of words appears in the specified language or is used by a specific user. For instance, a word tri-gram language model may be used to evaluate the linguistic likelihood of the interpretation of a given path of the segmentation graph.

The first step in character recognition analysis is typically to convert image data to black-and-white pixels that are represented by a two-dimensional matrix. Within the matrix, a "1" denotes a black pixel, and a "0" denotes a white pixel. The Image Processing Module identifies regions of the matrix that represent a character, and segments the matrix regions surrounding a character into sub-region segments. The Image Processing Module compares each matrix sub-region segment to a database of matrices representing characters with different fonts. The comparisons are used to identify a character that the matrices most resemble statistically.

Figure 5:
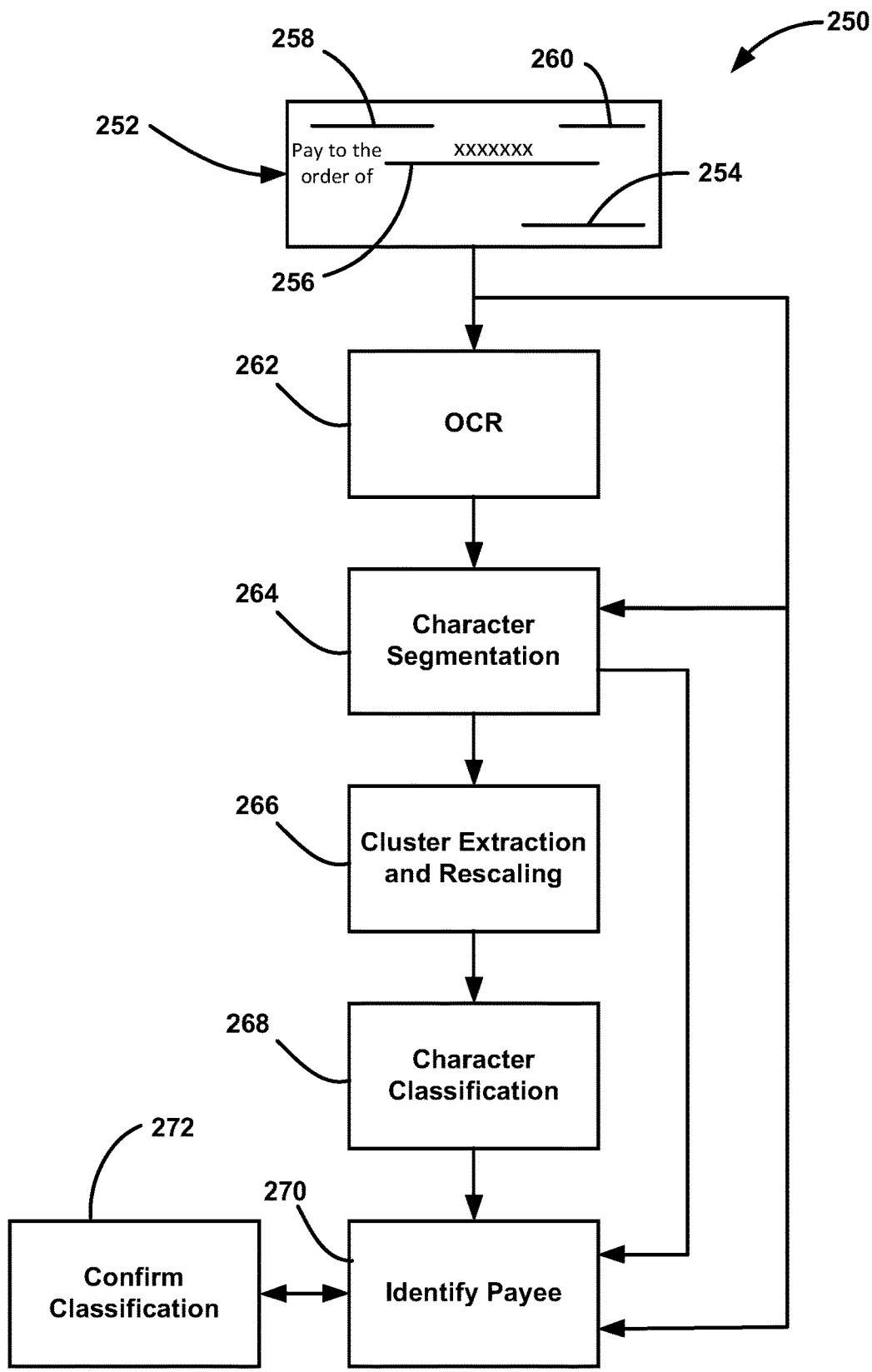
FIG. 5 is an example process for content recognition according to one embodiment.

In another embodiment, the Image Processing Module uses clustering analysis to perform OCR and identify characters. FIG. 5 depicts a flow diagram illustrating a process for identifying handwritten characters in an image. The transfer instrument includes a signature line 254, a line for source identification data 258, and a sequence data line 260 (i.e., a date), among other data fields. The images are subject to OCR processing at step 262 that reads and converts typed and/or printed text on the image 252 into machine-encoded text.

One suitable algorithm for this purpose is TESSERACT available through the PYTHON software suite. Such OCR algorithms read and convert typed text in the image 252 with a high degree of accuracy, but the algorithms may not always reliably read and convert handwritten text on a transfer instrument. An example of handwritten text is shown as the transfer instruction "pay to the order of" positioned next to the source identification data line 258 of the transfer instrument. The OCR algorithm is programmed to identify the expected location of the certain characters in the image or other suitable typed text in the image 252, such as recognizing that sequencing data generally appears to the right of printed text stating "date" or that source identification data generally appears in the upper left portion of an image.

The image 252 can be subjected to a density-based clustering algorithm that provides character segmentation at step 264 that also receives the location of the target identification data line 256 in the image 252. The image data can be converted to black and white with a "1" representing a non-white pixel and a "0" representing a white pixel. The clustering algorithm identifies clusters of non-white pixels in the area of the image 252 identified by the OCR algorithm. Each separately identified cluster may be, for instance, a handwritten character that is part of the target identification data that is handwritten proximate to line 256.

The section of the image 252 being examined is processed as a matrix of pixels where each non-white pixel is considered a data point for the clustering process. One suitable density-based clustering algorithm is Density-Based Spatial Clustering of Applications with Noise ("DBScan"), which is a density-based clustering non-parametric algorithm. Given a set of points in a set space, the DBScan algorithm groups together pixels that are closely packed together (i.e., non-white pixels with many nearby neighbors that are also non-white pixels). The algorithm also marks as outliers points that lie alone in low-density regions whose nearest neighbors are too far away (i.e., a pixel distance above a predetermined threshold). The output of the clustering algorithm is a dataset array that digitally identifies the X and Y coordinates of the pixels in each identified character cluster along with an assigned label for each cluster where the algorithm will assign the same cluster label to data points that are part of the same cluster.

The clustering algorithm is effective for identifying clusters of pixels in the image 252 that are part of the same character. However, some letters, such as, for example, capital "I," may look like two clusters to the algorithm because of the top and bottom bars in the letter. Handwriting heuristics can be employed to add constraints to the clustering algorithm to reduce the probability that more than one cluster dataset array is identified for the same character and/or one cluster dataset includes more than one character. For example, since the source identification data will be written from left to right on the transfer instrument, the clustering algorithm could be designed with a constraint where clusters cannot be stacked top to bottom on the transfer instrument relative to the handwriting direction of the source identification data. In other words, if two clusters are identified in a vertical direction at the same left to right location on the image 252, then that cluster can be considered a single cluster for one character.

Further, a limit to the size or area of the cluster can also be employed as a useful constraint. For instance, if the size of the cluster exceeds a predetermined threshold, then the Image Processing Module denotes the cluster as including more than one character. In that case, the Image Processing Module processes the group of pixels as comprising multiple clusters and characters. In other words, a constraint can be employed that limits the size of each cluster to be less than a predetermined maximum size. Also, a person will typically write in a manner where all of the characters are about the same size or width. If there is a significant inconsistency in the size of the clusters, then the cluster process can be further refined to identify additional clusters. In other words, a constraint can be employed that requires all of the clusters to be within a certain percentage size of each other.

The dataset array from the clustering algorithm is provided to a cluster extraction and rescaling algorithm at step 266 that extracts the individually identified clusters in the dataset array into individual dataset arrays and rescales each individual dataset array into, for example, a twenty-eight by twenty-eight (28×28) pixel cluster image, using extrapolation, which retains the main features of the image 252. The rescaling process also centers the cluster in the cluster image and adds border padding.

Figure 6:
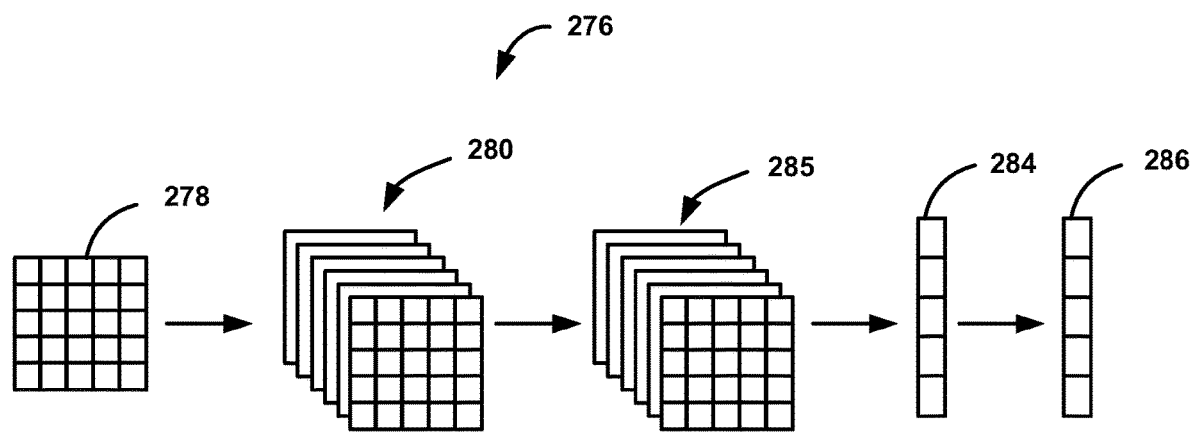
FIG. 6 is an illustration of a neural network that can be used in a character classification model.

Each individual cluster image is provided to a character classification model at box 268 that classifies the likelihood that each cluster image is a particular character. The classification model employs a neural network, such as convolutional neural network 276 shown in FIG. 6. The neural network 276 includes an input layer 278 that receives the cluster image, a convolutional layer 280 that classifies the image, a pooling layer 285 that reduces the dimensions of feature maps, a fully connected layer 284 that connects the nodes between layers, and an output layer 286 that outputs the classified characters.

The neural network 276 can be trained using a known set of training images, where each training image illustrates a letter or a number that has been assigned one of sixty-two character classes, namely, the upper case letters A-Z, the lower case letters a-z, and the numbers 0-9. The nodes in the neural network 276 are weighted, and those weights are tuned during the training process to allow the neural network 276 to determine what locations in the image 274 include non-white pixels of a particular character. The training process first feeds the neural network 276 character training images of known character values. Then the neural network 276 is fed character training images without identifying the characters. The node weights are adjusted based on correct character identification answers and incorrect character identification answers. The known set of training images could be the EMNIST™ dataset, which is a set of 697,932 handwritten character digits derived from the NIST Special Database 19 and converted to a 28 by 28 pixel image format and dataset structure.

During operation, the neural network 276 determines the likelihood that each image 274 is each of the sixty-two characters, and selects the character with the highest likelihood as the character for that image 274. The classification model outputs a string of characters from left to right along the source identification data line 256, for example, and identifies spaces between certain characters where non-white pixels do not exist as an indication of a separation between words. The classification model can employ any algorithm suitable for the purposes described herein, such as PYTORCH clustering, which is an open source machine learning framework used for applications such as computer vision and natural language processing.

In some embodiments, the content recognition analysis can rely in part on MICR techniques. The MICR techniques generally require a dedicated magnetic reader device that is integrated with, or in signal communication with, the user computing device or provider terminal computing device. Portions of a transfer instrument can include characters printed or generated with magnetic ink or toner that are detected by the magnetic reader device to identify characters.

After performing content recognition and feature detection analyses, the system can perform a segment classification analysis to identify components of the transfer instrument represented by the recognized characters or "content elements." In some embodiments, the system first identifies groups of content elements (i.e., groups of letters or numbers) and compares the content element groups against a database of known segments classifications, such as a payee field or a transfer value field. In other embodiments, natural language processing software can be used to identify groups of characters as representing a segment of the transfer instrument.

Transfer Instrument Segmentation

A segment analysis segments or divides a transfer instrument into logical sections or components. The segmentation can be based on transfer structure, such as lines between text, segment titles, line breaks, indentations, or combinations of such features. In one embodiment, the segments are identified using a categorizer that can be, for example, a probabilistic latent semantic analysis ("PLSA") model trained on a set of segment categories, such as the "pay to the order of field," a "date" field, or a "for"/note field. In one embodiment the categorizer is trained to detect the beginning of each section, for example, by classifying each group of content elements or lines as being a segment identification or not (i.e., words or symbols denoting a segment of the transfer instrument).

The segmentation analysis can also divide a transfer instrument or document by splitting the image data into text components, non-text components, encoded components, or standard non-encoded components. A non-text components may be an image or other drawing. Examples of a non-text components could include a provider logo or symbol, a handwritten or digital signature, a holographic image or watermark for security, a personalized mark for a user (e.g., a company logo, collect logo, ornamental drawings), a box to receive a transfer value amount, or a box or line that represents an input field such as an "X" mark to the left of an elongated line designated to receive a signature (e.g., a line that is denoted "X _____"). A text components is a collection of human readable content elements or characters that can be processed by an OCR system. Examples of a text section could be denoted by the text "pay to the order of" or a series of numerical characters representing routing data or a product identification number.

An encoded components incorporates data in one of a variety of converted, representative formats where the original data is converted and represented by symbols, shapes (e.g., boxes, squares, rectangles, circles, triangles, etc.), lines, outlines, patterns, bar codes, Quick Response codes, shading, colors, images, encrypted data, holograms, watermarks, alphanumeric characters (that differ from the original data), magnetic fields, or wireless signals. The encoded components can incorporate higher densities of data where, for example, a QR code represents long strings of text that could not otherwise be displayed with standard ASCII characters. The encoded components may also include that that is not readily read by a human, thereby enhancing security of a document. The non-encoded components include all other segments or sections outside of an encoded component.

Two techniques for segmentation include geometric segmentation and logical segmentation. According to geometric segmentation, a transfer instrument is split into text and non-text based on its geometric structure. Geometric segmentation can be used to identify encoded components that use shapes, symbols, and the like, such as standard one-dimensional bar codes or two-dimensional QR codes. A logical segmentation is based on its logical labels such as the "for" field, "pay to the order" of field, "endorsement" field or the like. Logical segmentation is a process of splitting digital text into words, sentences, paragraphs, topics or meaningful sections.

Identifying the structure of a transfer instrument image can rely on an analysis of font sizes or content element positioning. In one example embodiment, transfer instrument parameters such as character size and spacing between characters, or words and lines are used to represent document physical layout. As an example, the second, or back side of a transfer instrument can include capital content element characters stating "FOR OFFICIAL USE ONLY" or "Endorse Here" that designate segments of the transfer instrument. Software techniques used in physical layout analysis can include: top-down, bottom-up, or hybrid software analysis techniques.

Top-down software techniques start from the whole transfer instrument image and iteratively split it into smaller ranges. Bottom-up software techniques start from transfer instrument image pixels and cluster the pixels into connected components, such as characters that are then clustered into words, lines or zones. A mix of the two approaches is the hybrid approach.

One example bottom-up software technique includes using the K-nearest neighbors algorithm for each connected component of a transfer instrument side and uses distance thresholds to form text lines and blocks. Other examples include separating text components in graphics regions using a Hough transform. Top down approaches include the X-Y-cut algorithm based on recursively cutting a side of a transfer instrument into smaller rectangular areas. A hybrid approach can include identifying gaps between text and images and grouping the gaps into separators after horizontal smearing of black pixels.

In one embodiment, the system relies neural networks trained with annotated data that identify physically divided sections. The system can include separate software modules for line and section classification. The line classification software module itself includes a features extractor and line classifier module. The features extractor takes layout information and text as input. Based on heuristics, the feature extractor software module extracts features from layout information and text. Features include text length, the number of noun phrases, font size, higher line space, bold, italics, colon, and number sequence at the beginning of a line. The line classification module implements multiple classifiers using techniques such as support vector machines, decision tree, Naive Bayes, and Recurrent Neural Networks.

The outputs of the line classifier module can be segment data identifications and standard content element characters. The segment data identifiers may be top-level categorization segment or a sub-segment. The segment classifier module of the segment classification sub unit takes section segment data identifications as input and classifies them as top-level, sub-segments or a top-level segment identification using RNN. The segment classification software module also has a Segment Boundary Detector that detects the boundary of a segment using different level of segment headers and regular text. It generates physically divided segment and finds relationship among top-level, segments and sub-segments. It also generates an index from a transfer instrument based on the relationship among different levels of segment.

In some embodiments, a semantic annotation software module annotates each divided section with a semantic name. The software module has a semantic labeling module that implements a Latent Dirichlet Allocation ("LDA") topic modeling technique to yield a semantic concept from each of the sections and annotates each section with a semantic concept understandable to system users.

In yet other embodiments, the first step in image processing is to process image data using a Fully Convolutional Neural Network that uses the images of the transfer instrument as inputs and yields as outputs a map of probabilities of attributes predicted for each pixel. That is, each pixel is associated with probabilities that it belongs to a particular category of transfer data or transfer instrument segments that are identified by a provider during training. Training labels are used to generate masks and these mask images are the input data used to train the network. The second step of the content recognition analysis maps the predictions to the desired output of transfer instrument segments.

Post processing steps can include: (i) thresholding to create a binary map from the predictions output by the network; (ii) morphological operations that analyze and process geometric structures within the image data (e.g., lines for handwriting, boxes for user inputs, provider logos, etc.); (iii) connected component analysis used to filter out small connected components; and (iv) shape vectorization to transform detected regions into a set of coordinates where "blobs" in the image data are extracted as polygonal shapes, such as lines or quadrilaterals.

In addition to segmenting the transfer instrument into logical sections or components, the system can extract transfer data by grouping content elements into tokens, such words or groups of words that comprise the transfer data. To illustrate with a simplified example, the system processes an electronic transfer instrument image using a content recognition analysis to identify the individual content elements, such as a series of characters "P," "a," "t," "r," "i," "c," and "k." The content elements are grouped into tokens, such as words, and groups of tokens are identified as one or more clusters. Thus, the string of content elements above is recognized as a token "Patrick." The token Patrick is identified as a name with semantic and heuristic processing techniques and grouped with additional tokens to identify a full cluster, such as the individual name "Patrick Smith" or the business name "Patrick Family Restaurants."

As another example, a string of content elements and tokens "Deposit to Saving 1234" is identified as a cluster representing transfer instructions placed on a transfer instrument that denotes parameters for how an electronic transfer is conducted. The identification of content elements, tokens, and clusters of data is facilitated by a segment analysis that recognizes a structure of a transfer instruments where particular regions of a transfer instrument image represent specific elements of data, such as a written resource value data indicating the volume of resources subject to an electronic transfer.

As a further non-limiting example, the system can process image data representing a transfer instrument using a content recognition analysis to identify the string of content elements "pay to the order of" adjacent to a string of handwritten, scripted content elements "Patrick Smith." The system then performs a segment analysis to generate segmentation data identifying the "payee line" of a transfer instrument. The segment map index data identifies the payee line as being adjacent to the text "pay to the order of." The system identifies the handwritten content elements "Patrick Smith" as being a payee user identification component of the transfer data. The user identification can be stored for later analysis, such as validating the correct user identification for enhanced security and accuracy.

Grouping content elements into tokens or words can be performed using natural language processing technology alone or in combination with segmentation software processing techniques. In one embodiment, grouping content elements can be performed by an extraction software module that is trained to label tokens and clusters according to classifications of transfer data, such as a transfer source identifier, a transfer target identification, a provider identifier, among other categories. The extraction software module can be implemented with a rule-based software technique, with probability models implemented by neural networks, such as Conditional Random Field system, or with combinations of rule-based techniques and neural networks.

Generating tokens can also be performed by detecting white spaces between content elements. Morpho-syntactic analysis entails identifying candidate parts of speech ("POS") for each word, such as noun (e.g., a transfer source identification) or a verb (e.g., as part of a transfer instruction). This may performed using a rules-based software engine alone or in combination with a hidden Markov model.

The segment analysis and token extraction can generate map index data that identifies the locations of segments and tokens with image data representing a transfer instrument. For example, each content element (including spaces between tokens) can be indexed in a sequence using pixel coordinates. Segments and tokens can be indexed according to a first coordinate index and an index length. For example, transfer data for a target identification can have a location index coordinate and a length that maps the target identification data to a matrices of pixels within an image.

Natural Language Processing Technology

The systems and methods can process electronic transfer instruments using artificial intelligence and natural language processing technology to identify text data within the transfer instrument and to classify the text data. The system processes a transfer instrument by determining the overall structure of the transfer instrument according to various segments. Then within each segment, the system recognizes individual content elements, such as characters, numbers, and symbols within the transfer instrument. The system next identifies what the content elements represent by classifying various segments, or components of the transfer instrument.

Human-readable alphanumeric content data, or text data, representing linguistic expressions can be processed using natural language processing technology that is implemented by one or more artificial intelligence software applications and systems. The artificial intelligence software and systems are in turn implemented using neural networks. Natural language processing technology analyzes one or more files that include alphanumeric text data composed of individual communication elements, such as text characters, words, symbols, or numbers. Natural language processing software techniques can be implemented with supervised or unsupervised learning techniques. Unsupervised learning techniques identify and characterize hidden structures of unlabeled text data. Supervised techniques operate on labeled text data and include instructions informing the system which outputs are related to specific input values.

Supervised software processing rely on iterative training techniques and training data to configure neural networks with an understanding of individual words, phrases, subjects, sentiments, and parts of speech. As an example, training data is utilized to train a neural network to recognize that phrases like "Pay to the order of," "for deposit only," or "endorse here" all relate to the same general subject matter when the words are observed in proximity to one another at a significant frequency of occurrence.

Supervised learning software systems are trained using text data that is well-labeled or "tagged." During training, the supervised software systems learn the best mapping function between a known data input and expected known output (i.e., labeled or tagged text data). Supervised natural language processing software then uses the best approximation mapping learned during training to analyze previously unseen input data to accurately predict the corresponding output.

Supervised learning software systems require iterative optimization cycles to adjust the input-output mapping until the networks converge to an expected and well-accepted level of performance, such as an acceptable threshold error rate between a calculated probability and a desired threshold probability. The software systems are supervised because the way of learning from training data mimics the same process of a teacher supervising the end-to-end learning process. Supervised learning software systems are typically capable of achieving excellent levels of performance when enough labeled data is available.

Supervised learning software systems utilize neural network technology that includes, without limitation, Latent Semantic Analysis ("LSA"), Probabilistic Latent Semantic Analysis ("PLSA"), Latent Dirichlet Allocation ("LDA"), or Bidirectional Encoder Representations from Transformers ("BERT"). Latent Semantic Analysis software processing techniques process a corpus of text data files to ascertain statistical co-occurrences of words that appear together which then yields insights into the subjects of those words and documents.

Unsupervised learning software systems can be designed with integrated intelligence and automation to automatically discover information, structure, and patterns from text data. Unsupervised learning software systems can be implemented with clustering software techniques that include, without limitation, K-mean clustering, Mean-Shift clustering, Density-based clustering, Spectral clustering, Principal Component Analysis, and Neural Topic Modeling ("NTM"). Clustering software techniques can automatically group semantically similar content elements together to accelerate the derivation and verification of an underlying common segment—i.e., ascertaining or deriving a new segment or element of transfer data, rather than classifying transfer data into an adjacent segment. This permits the system, for example, to distinguish between the "payee" segment of transfer data being above or adjacent to the "transfer value data" or amount of resources being transferred.

The software utilized to implement the present systems and methods can utilize one or more supervised or unsupervised software processing techniques to perform a segment classification analysis to generate segment data that characterizes the segments of transfer data and other content within a transfer instrument. Suitable software processing techniques can include, without limitation, Latent Semantic Analysis, Probabilistic Latent Semantic Analysis, Latent Dirichlet Allocation. Latent Semantic Analysis software processing techniques generally process a corpus of text files, or documents, to ascertain statistical co-occurrences of words that appear together which then gives insights into the subjects of those words and documents. The system software services can utilize software processing techniques that include Non-Matrix Factorization, Correlated Topic Model ("CTM"), and KMeans or other types of clustering.

As part of a natural language processing analysis, the text representing the transfer data is vectorized to map the alphanumeric text into a vector form. One approach to vectorizing text data includes applying "bag-of-words" modeling. The bag-of-words approach counts the number of times a particular word appears in text data to convert the words into a numerical value. The bag-of-words model can include parameters, such as setting a threshold on the number of times a word must appear to be included in the vectors.

Techniques to encode the context of words, or content elements, to determine how often communication elements appear together. Determining the adjacent pairing of content elements can be achieved by creating a co-occurrence matrix with the value of each member of the matrix counting how often one content element coincides with another, either just before or just after it. That is, the words or content elements form the row and column labels of a matrix, and a numeric value appears in matrix elements that correspond to a row and column label for content elements that appear adjacent in the text data.

The text or symbols representing the content data is processed using a segment classification analysis to determine segment data that represents identifiers of segments of transfer data within the transfer instruments. The segment identifiers correspond to identifiable, discrete components of the transfer instrument, such as a routing data, a product identification, an augmentation, transfer value data, sequencing data, or user contact data, among other segments.

In one embodiment, the segment classification analysis is performed on the text data using a Latent Drichlet Allocation analysis to identify segment data that includes one or more segment identifiers (e.g., components of the electronic transfer instrument). Performing the LDA analysis on the transfer instrument content element data may include transforming the content elements into an array of text data representing key words or phrases that represent a segment (e.g., a bag-of-words array) and determining the one or more segment identifiers through analysis of the array. Each cell in the array can represent the probability that given text data relates to a given segment. A segment is then represented by a specified number of words or phrases having the highest probabilities (i.e., the words with the five highest probabilities), or the segment is represented by text data having probabilities above a predetermined subject probability threshold.

Clustering software processing techniques include K-means clustering, which is an unsupervised processing technique that does not utilized labeled text data. Clusters are defined by "K" number of centroids where each centroid is a point that represents the center of a cluster. The K-means processing technique run in an iterative fashion where each centroid is initially placed randomly in the vector space of the dataset, and the centroid moves to the center of the points that is closest to the centroid. In each new iteration, the distance between each centroid and the points are recalculated, and the centroid moves again to the center of the closest points. The processing completes when the position or the groups no longer change or when the distance in which the centroids change does not surpass a pre-defined threshold.

The clustering analysis yields a group of words or content elements associated with each cluster, which can be referred to as segment data vectors. Segments may each include one or more segment vectors where each segment vector includes one or more identified content elements (i.e., keywords, phrases, symbols, etc.) within the transfer instrument text data as well as a frequency of the one or more content elements within the transfer instrument text data.

Named Entity Recognition ("NER") software processing techniques can be used to identify various content sources within the text data. NER techniques are utilized to classify a given word into a category, such as a person, product, organization, or location. Using NER techniques to process the text data allow the system to identify particular words and text as a noun and as representing a transfer source provider or user (i.e., a payer) or transfer target provider or user (e.g., a payee).

Neural networks are trained using training set text data that comprise sample tokens, phrases, sentences, paragraphs, or documents for which desired subjects, content sources, interrogatories, or sentiment values are known. A labeling analysis is performed on the training set text data to annotate the data with known segment labels, thereby generating annotated training set text data. For example, a person can utilize a labeling software application to review training set text data to identify and tag or "annotate" various segments within a transfer instrument.

The training set text data is then fed to a natural language software service neural networks to identify segments, transfer sources, and various other elements of transfer data and the corresponding probabilities. For example, the analysis might identify that particular text represents an augmentation, or "endorsement," with a 35% probability. If the annotations indicate the text is, in fact, an augmentation, an error rate can be taken to be 65% or the difference between the calculated probability and the known certainty. Then parameters to the neural network are adjusted (i.e., constants and formulas that implement the nodes and connections between node), to increase the probability from 35% to ensure the neural network produces more accurate results, thereby reducing the error rate. The process is run iteratively on different sets of training set text data to continue to increase the accuracy of the neural network.

Encoding Transfer Instruments

In some embodiments, a user can manually enter transfer data into a GUI, and a user computing device or provider device generates a transfer instrument consisting of encoded transfer data. Examples include encoding transfer data using a bar code, a QR code, a hologram, one or a series of images, or encrypted data.

Several bar code types and standards are available and could be used to generate a transfer instrument. A bar code appears as machine-readable indicia that carries information encoded into bars, lines, and spaces of various widths arranged in predetermined patterns. The bars and spaces are made up of unit elements called modules. A module has a specified height and width. The width is usually called the horizontal dimension of the module. When a bar code laser or light scanner scans a bar code, bar code modules are usually crossed by the scanning beam typically along its horizontal dimension, but many bar codes may be scanned omni-directionally. Bar code readers includes an optical scanner, a decoder, a display device, and/or a communication system for transmitting decoded information to a computer system for processing. Bar codes can also be read by a camera coupled to a computing device that processes captures image data to determine the width of the various bars and spaces and ultimately decode the underlying data.

A number of different one-dimensional bar code encoding schemes exist. Encoding schemes include, but are not necessarily limited to, UPC-A, UPC-E, EAN-8, EAN-13 and UCC/EAN-128, Code 39 and/or other common-type and known one-dimensional bar codes. Encoding schemes may also include applicable Application Identifiers, UCC Coupon Value Codes and HIBC UCC/EAN-128 Secondary Input Data formats encoded in UCC/EAN-128, among others. Encoding schemes are configured to encode information that includes the entire ASCII character set.

Quick Response codes are two-dimensional, matrix bar codes that can be read by two-dimensional image sensors such as scanners and digital cameras. Unlike the familiar one-dimensional bar codes, the QR code design allows characters to be stored in a format where the data is not identified by a single set of vertical black strips. Instead, black dots are arranged on a square grid against a white background. Data can be stored in patterns along both the horizontal and vertical direction components. The data stored in the image is read by an imaging device and then a processing device interprets the image. QR codes feature three distinctive squares at three corners of the QR code image, with another image in the fourth corner. The other image can be a smaller square or a series of squares and is used for standardizing the image.

Quick Response code image data generally includes an encoding region and function patterns. The function patterns comprise (i) the finder patterns in three corners of the QR code image; (ii) separators separating each finder pattern from the rest of the symbol; and (iii) timing patterns. The finder patterns define the corners of a right-angled triangle. The finder pattern opposite the hypotenuse of the triangle is typically positioned adjacent the top left corner of the symbol; though, other locations can be used. The finder pattern consists of a blocks of black modules of a particular dimension (e.g., 3×3 pixels or blocks), surrounded by a square ring of white modules that is one module thick. The square ring of white modules is, in turn, surrounded by a square ring of black modules that is itself one module thick. Further details regarding QR-Code symbols and decoding may be found in the AIM Global (Association for Automatic Identification and Mobility) International Symbology Specification for QR-Code (ISS QR-Code), the content of which is incorporated herein by reference.

QR codes use Reed-Solomon error correction over the finite field the elements of which are encoded as bytes of 8 bits. The number of data versus error correction bytes within each block depends on the version (side length) of the QR symbol and the error correction level. There are four error correction levels. The higher the error correction level, the less storage capacity. In larger QR code images, the message is broken up into several Reed-Solomon code blocks. The block size is chosen so that no attempt is made at correcting more than fifteen errors per block to limit the complexity of the decoding algorithm. The code blocks are then interleaved together, making it less likely that localized damage to a QR symbol will overwhelm the capacity of any single block.

The format information records two things: the error correction level and the mask pattern used for the symbol. Masking is used to break up patterns in the data area that might confuse a scanner, such as large blank areas or misleading features that look like the locator marks. The mask patterns are defined on a grid that is repeated as necessary to cover the whole symbol. Modules corresponding to the dark areas of the mask are inverted. The format information is protected from errors with a BCH code with two complete copies included in each QR image. The message dataset is placed from right to left in a zigzag pattern. In larger symbols, this is complicated by the presence of the alignment patterns and the use of multiple interleaved error-correction blocks.

Types of QR codes that can be used with the present invention include, without limitation: (i) Models 1 and 2 QR code, which are older version of the specification; (ii) Micro QR code is a smaller version of the QR code standard for applications where symbol size is limited; (iii) Secure Quick Response ("SQR") codes that contains a private data segment after the terminator instead of the specified filler bytes where the private data segment must be deciphered with an encryption key; (iv) JAB codes that are color 2D matrices made of color squares arranged in either square or rectangle grids; (v) Frame QR having a canvas area that can be flexibly used where graphics, letters, and more can be flexibly arranged, making it possible to lay out the code without losing the design of illustrations, photos, and the like; and (vi) High Capacity Colored 2-Dimensional that uses colors for increasing data density.

In other embodiments data can be encoded on a transfer instrument using a hologram. A hologram is a recording of an interference pattern that can reproduce a three-dimensional light field using diffraction. The reproduced light field generates an image that still has the depth, parallax, and other properties of the original scene. A hologram is a photographic recording of a light field, rather than an image formed by a lens. The encoding of the light field is in the form of an interference pattern of variations in the opacity, density, or surface profile of the photographic medium. The interference pattern diffracts the light into an accurate reproduction of the original light field, and the objects that were in it exhibit visual depth cues such as parallax and perspective that change realistically with the different angles of viewing. That is, the view of the image from different angles represents the subject viewed from similar angles.

A hologram is made by superimposing a second wave front (normally called the reference beam) on the wave front of interest, thereby generating an interference pattern which is recorded on a physical medium. When only the second wave front illuminates the interference pattern, it is diffracted to recreate the original wave front. Holograms can also be computer-generated by modelling the two wave fronts and adding them together digitally. The resulting digital image is then printed onto a suitable mask or film and illuminated by a suitable source to reconstruct the wave front of interest.

Transfer instruments can further incorporate transfer and other data using visual cryptography that encrypts visual information (e.g., pictures, text) in a manner that appears as one or a series of encoded conventional images. The color and intensity of pixels that make up the images can be used to encode and represent underlying data. Other techniques for visual cryptography include splitting an image containing graphics or text into two or more component images. Each component image has a pair of pixels for each pixel in the original image. The pixels are shaded according to a set of predefined rules such that when the component images are overlaid one over the other, the original image is revealed. In this manner, one party such as the provider can possess an encryption "key" component image that is overlaid on encrypted image data printed on a transfer instrument to reveal the underlying data.

In other embodiments, transfer data can be securely incorporated into a transfer instrument through symmetric or asymmetric key encryption for authentication. Encryption methods can include, for instance, symmetric Data Encryption Standard ("DES"), 3DES, and public key Rivest-Shamir-Adleman's algorithm ("RSA"). Transfer data is encrypted using a key and incorporated into a transfer instrument as a series of content elements, such as alphanumeric characters. At the time a transfer is executed, the encrypted transfer data is uploaded to a user computing device or provider system, and the same (symmetric encryption) or a separate key (asymmetric encryption) is used to decrypt or decode the transfer data.

Asymmetric key encryption uses a private encryption key that must be kept secret from unauthorized users and a public encryption key that can be made available through unsecure channels. The public and private keys are mathematically linked. Data that is encrypted with the public key can be unencrypted only with the private key, and data encrypted with the private key can be verified only with the public key. Suitable asymmetric key encryption algorithms include, but are not limited to, the RSA algorithm, elliptic curve cryptography, Internet Key Exchange protocols, and PGP encryption protocols, among others.

When processing a transfer instrument, the transfer source and the transfer target (or the respective providers) each utilizes its own public-private encryption key pair. The encryption key pairs can be exchanged during the initiation of a transfer or during an authentication and enrollment process. Alternatively, the encryption key pairs can be preinstalled on computing devices. In other words, prior to being used to implement the systems and methods of the present invention, the provider system can be loaded with both its own public-private encryption key pair and the public-private key pair of a user computing device or smart device.

Interfacing with a Provider System

The present systems and methods allow end users to initiate, authorize, validate, and provide processing instructions for electronic transfers by creating an electronic transfer instrument. The systems and methods further allow users to generate, view, and apply to an electronic transfer instrument, electronic augmentations that provide information concerning the transfer, such as a user identification for the user receiving the transfer, a product identification, and instructions for processing the transfer.

Users generate transfer instruments, initiate electronic transfers, and apply electronic augmentations to transfer instruments using one or more software applications that are integrated with a computing device that is being utilized by a user, such as a user personal or mobile computing device or a provider terminal accessed by a user. The software can be created and maintained by the provider, such as a provider "mobile app," or created by a third-party source, such as an Internet browser software application that is used to interface with a provider system. The software employed by users to interface with the provider system will generally be referred to as a Provider Interface Application.

The Provider Interface Application can be integrated with, or installed on, a user computing device, a provider terminal computing device, or another type of computing device utilized by the user. The Provider Interface Application can itself be comprised of one or more software services, software modules, or application programming interfaces ("APIs") that interface with the other hardware and software components integrated with a computing device. In some instances, the Provider Interface Application may "call," or interface with, APIs or software services integrated with the computing device operating system software.

In the present system, the Provider Interface Application can include or can interface with a Camera API that converts inputs entered by a user into software messages, commands, and data that is formatted for processing by the camera device in performing image capturing functions. A user may select a capture input function or a "flash" input function on the user computing device that the Camera API converts into a software command that causes the camera to take a picture and emit a flash of light to enhance the resulting image. As further non-limiting examples, the Provider Interface Application can include an Interface Service Module that generates graphical user interfaces ("GUIs") displayed to users or an Image Processing Module that performs functions that analyze, edit, or manipulate image data from the camera.

The user computing devices launch and run integrated software applications, such as a Provider Interface Application, to securely connect to the provider system to create transfer instruments as performed by transfer sources, execute electronic transfers as performed by transfer targets), or generate electronic augmentations used to process a transfer also performed by transfer targets. Once a secure connection is established, end users navigate a series of GUIs to interact with the provider system and to create a transfer instrument or to digitize a transfer instrument that has been received. End users digitize a transfer instrument by, for instance, capturing a photograph of the transfer instrument, using a bar code reader to scan an encoded component/segment, applying a decryption key to decrypt an encoded component, or using other techniques to decode an encoded component. An electronic augmentation can be applied to the digitized transfer instrument and presented to the end user for verification before initiating the transfer. The user computing device interacts with components of a provider system, such as various network computing devices (i.e., a server).

In particular, user computing devices communicate with a provider system by sending data to and from external, public-facing component of the provider computing system, such as an external server that can be a web server or other external communication computing device. The external server in turn interacts with an internal interface computing device also associated with a provider computing system. Among other functions, the internal interface computing device is responsible for processing sensitive data gathered from the "back end" components of a provider computer system that may be protected by a firewall software application or system. The internal interface computing devices thus prevent third-party computing devices and applications and from having direct access to the sensitive data stored to a provider system.

The provider external server processes communication data requests sent to, and received from, the user computing device or from third party applications and computing devices. The external server routes communications requesting sensitive data through the internal server for secure communication. The internal server in turn communicates with other back end components of the provider system, such as databases and servers that store sensitive user data (e.g., account numbers, addresses, resource availability data or account balances, etc.).

In accessing the provider system, the user computing device transmits a user interface transmit command to the external server that can include: (i) an Internet Protocol ("IP") address for the user computing device; (ii) system configuration data; and (iii) navigation data (e.g., data corresponding to browsing history, or websites and Internet Protocol addresses accessed by the user computing device). In response to the user interface transmit command, the external server returns interface display data and a digital cookie that is stored to the user computing device and used to track functions and activities performed by the user computing device.

In some embodiments, the system configuration data and navigation data is utilized by the external server to generate the interface display data. For instance, the system configuration data might indicate that the user computing device is utilizing a particular Internet browser or mobile software application to communicate with the provider system. The external server then generates interface display data that includes instructions compatible with, and readable by, the particular Internet browser or mobile software application. As another example, if the navigation data indicate the user computing device previously visited a provider webpage, the interface display data can include instructions for displaying a customized message on the user computing device, such as "Welcome back Patrick!"

After receiving interface display data, the user computing device processes the display data and renders GUI screens presented to users, such as a provider website or a GUI within a provider mobile software application. In some embodiments, the system configuration data may be sent to the provider system in a separate message subsequent to the user interface transmit command message.

The interface display data can include one or more of the following: (i) webpage data used by the user computing device to render a webpage in an Internet browser software application; (ii) mobile app display data used by the user computing device to render GUI screens within a mobile software application; (iii) user transfer data, or just "transfer data," that is used by the user computing device to render a webpage GUI that provides users access to view user resource availability data (e.g., account types and balances) and to view, select, and establish transfer instruction parameters. Categories of interface display data can include graphical elements, digital images, text, numbers, colors, fonts, or layout data representing the orientation and arrangement graphical elements and alphanumeric data on a user interface screen.

The user computing device may also transmit system configuration data to the provider system that is used to verify a user identify or authenticate the user computing device. System configuration data can include, without limitation: (i) a unique identifier for the user computing device (e.g., a media access control ("MAC") address hard-coded into a communication subsystem of the user computing device); (ii) a MAC address for the local network of a user computing device (e.g., a router MAC address); (iii) copies of key system files that are unlikely to change between instances when a user accesses the provider system; (iv) a list of applications running or installed on the user computing device; and (v) any other data useful for evaluating users and authenticating a user or user computing device.

The user computing device can capture geolocation data that is used to authenticate the device or to create an electronic augmentation. The geolocation data can be captured from a global positioning system integrated with the user computing device. In other embodiments, the provider system can determine location data for the user computing device based on the user device IP address. The provider system includes a software application that transmits the user device IP address to an Identity & Location API that utilizes the device IP address to determine an approximate geographic location of the user computing device. The Identity & Location API passes the user device IP address to a database or a third-party software service that returns geographic location data for the user device IP address, such as a city, county, or state. The Identity & Location API stores the geographic data to a database record on the provider.

The user computing device authenticates to the provider system if the user has an existing electronic account with the provider. The user computing device navigates to a login GUI and enters authentication data, such as a user name or unique user identification, a password, a personal identification number ("PIN"), an alphanumeric code, or biometric information (e.g., a fingerprint or facial recognition). The authentication data, also known as user security data, can correspond to data and information that is known by the provider to be in possession of the user. The user then selects a submit function on the login GUI to transmit an authentication request message to the provider including the possession element data.

In some embodiments, the authentication data and/or authentication request message can further include elements of the system configuration data that are used to authenticate the user, such as a user computing device identification or a user device IP address. For example, upon launching the Provider Interface Application, the user enters a fingerprint or a PIN code. The user computing device automatically gathers system configuration information that is sent to the provider system along with the authentication data within an authentication request message.

The provider system passes the authentication request message to an identity management service, which performs a verification analysis to verify the identity of the user or user computing device. The verification analysis compares the received authentication data to stored user authentication data to determine whether the received and stored authentication data sets match. The identity management service, thus, determines whether a correct user name, password, PIN, biometric data, device identification, or other authentication data is received.

In some embodiments, the identity management service receives authentication data that includes biometric data or a PIN code with or without system configuration data. The identity management service utilizes the received authentication data to determine the user identification based on a query to the provider database. The user thus enters non-identifying information such as a PIN that is used along with or without system configuration data to identify the user.

Once the verification analysis verifies the end user and/or user computing device, the identity management service returns an authentication notification message to a provider external server. The authentication notification message includes a verification flag indicating whether the verification passed or failed and a reason for a failed authentication, such as an unrecognized user name, password, PIN, biometric data, or user computing device identification.

The user authentication request message can also include system configuration data, and the provider's back end servers can use system configuration data and user account data to perform the authentication process. As one example, the identity management service might store a user computing device MAC address to a database record as part of the user account data. Upon receipt of an user authentication request message that includes a MAC address, the identity management service compares the received MAC address data against stored MAC address data that is associated with the user account data. In this manner, the user computing device can also be authenticated to the provider system. If the received and stored MAC addresses do not match, the identity management service returns an authentication decision message to the external server indicating the authentication failed because the user computing device could not be authenticated. The external server can then prompt the user to verifying whether the consumer is using a new device to login to the provider system, and if so, begin the process of registering a new device to the provider's system.

The system verification analysis can also utilize multifactor authentication techniques ("MFA") to authenticate the user identity or a user computing device. As one example, if the user authentication data is successfully verified, a MFA software process running on the provider system can initiate a telephone call or send a short message service ("SMS") text message to a phone number stored as part of the verification analysis. Upon receiving a call, the user selects an input function on the telephone to transmit response data to the MFA software process that confirms receipt of the call, thereby further authenticating the user's identity. The function can be the user's selection of any key on the telephone or a pre-determined sequence of keys, such as a passcode. Alternatively, on receiving a SMS text message that includes a numeric or alphanumeric code, the user enters the code into a user interface such as the Provider Interface Application or website. The code is transmitted to the MFA software process to verify receipt by the user.

Those of skill in the art will appreciate that other forms of MFA are possible, such as sending a text message containing a passcode to the user's cellular phone that must be entered into a user interface screen or utilizing a separate software application running on the user computing device to generate a key or passcode that is verified by the provider system.

The provider system stores a variety of end user data that characterizes the end user and the end user relationship to the provider. The end user data is utilized in generating transfer instruments, digitizing transfer instruments, authenticating end user identification, or generating electronic augmentations, among other functions.

The end user data is stored to an End User Database as user profile database records and includes, without limitation: (i) a user identification; (ii) user contact data, such as a mailing address or a geographic region where the user resides (e.g., a zip code, city, state); (iii) user source data, such as user telephone number data, user device IP address, an email address, or a social media account name; (iv) co-user or co-authorized user identification(s) that identify other users who are authorized to use a given provider product; (v) one or more account identifications or provider product identifiers that indicate the accounts or products currently held by a user; (vi) location data, such as a geographic position as determined from a Global Positioning System ("GPS") integrated with the user computing device or from a user computing device IP address; (vii) user activity data that is representative of various functions or selections utilized by a user; (viii) system configuration data; and (ix) navigation data.

The user activity data can include a wide variety of information that tracks activities of a user when utilizing a provider system. Examples of user activity data include, but are not limited to: (i) a log of user attempts to access a provider system, including the date, time, device used, and device IP address; (ii) navigation data, including the GUIs accessed by a user while logged into the provider system; (iii) settings edited by a user or selections made by a user (e.g., a selection to view or decline to view a notification or message); (iv) a log of written communications between a user and a provider, including the communication content data, a date, time, an identifier for the device used, and a device IP address; (v) a log of support requests or telephone calls between a user and a provider; (vi) resource transfers logs; or (vii) other functions and activities performed by a user that are capable of being recorded electronically.

Generating Encoded Transfer Instruments

Figures 7, 8:
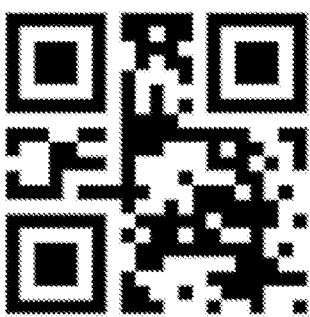
FIG. 7 illustrates a conventional transfer instrument.
FIG. 8 illustrates an encoded transfer instrument.

Conventional transfer instruments are generated by end users manually handwriting transfer data into a hardcopy transfer instrument, such as the example conventional transfer instrument shown in FIG. 7. Conventional transfer instruments do not include encoded components, and the transfer data is generally human readable. The systems and methods disclosed herein permit the generation of transfer instruments that include an encoded component, such as the transfer instrument shown in FIG. 8 having an encoded component depicted as a QR code. The encoded transfer instrument can be generated in an electronic format, such as an image file or a portable document format file.

Transfer instruments can be generated by a provider system or by end user computing devices that establish a secure communication session with a provider system through a Provider Interface Application. End user computing devices navigate the provider system using a series of GUIs to access a transfer instrument generation GUI (not shown). The transfer instrument creation GUI can include text boxes to receive typed inputs, radio boxes, pull-down menus, and other input functions that users utilize to input transfer data. For instance, users can input target identification data that names or identifies the person receiving the transfer as well as transfer value data that represents the amount or volume of resources being transferred.

The transfer data included within the transfer instrument can include, without limitation: (i) source identification data that names or identifies the source of the resource transfer; (ii) sequencing data, such as a date that the transfer instrument was created or data that otherwise indicates an order or sequence in which the transfer instrument was created relative to other transfers and transfer instruments; (iii) target identification data that names or identifies the user receiving the transfer; (iv) transfer value data that represents the amount or volume of resources being transferred; (v) a source signature data, such as a handwritten marking or a series of alphanumeric characters or symbols used to identify the third party transfer source and that serves as a designation that the transfer is authorized by the third party; (vi) source contact data, such as a mailing address, phone number, or email address of the third party source; (vii) source provider identification data that names or identifies a provider that renders services to the third party transfer source in implementing the transfer; (viii) a transfer instrument identification, which can be an alphanumeric string of characters that is unique to the transfer instrument (e.g., a document identification number); (ix) routing data used to route the transfer from the transfer source provider to the recipient user provider; (x) a source product identification (e.g., an account number for the transfer source); and (xi) notation data that can be alphanumeric textual content generated by the third party transfer source, such as a short narrative describing the purpose of the transfer (shown as the "Memo" line in FIG. 7).

After a user has finished entering transfer data into the transfer data generation GUI, the user can select an input function that generates a digital transfer instrument as an image file, PDF file, or another suitable electronic file format. One or more elements of the transfer data can be included in an encoded component, such as the QR code shown in FIG. 8. In particular, a comparison of FIGS. 7 and 8 indicate that the encoded component replaces the source identification data, the source contact data, the target identification data, the transfer value data, the source signature data, the routing data, the source product identification, and the notation data.

Those of skill in the art will appreciate that the examples shown in FIGS. 7 and 8 are not intended to be limiting, and an encoded component of transfer instrument can include more or less transfer data elements. For instance, in another embodiment, the routing data and product identification data can be included in a conventional MICR line at the bottom of a first side of the transfer instrument instead of, or in addition to, being included in the encoded component.

Significantly, the transfer instrument can also include a marking component/segment for placement of a conventional endorsement or an electronic augmentation, as discussed in more detail below. The utilization of an encoded component allows more transfer data to be included on the transfer instrument in a smaller area. That is, the transfer data occupies less area on the surface of the transfer instrument when the transfer data is included within the encoded component than when the transfer data is displayed with alphanumeric characters.

The densification of data on the transfer instrument in turn allows the marking component and each element of the transfer data to be included on a single side of the transfer instrument, which is more efficient than conventional transfer instruments that require two sides. Including the marking component on the same side as the encoded component also enables remote transfers, or "mobile deposits," to be executed by capturing an image of and reading only a single side of the transfer instrument as opposed to conventional remote transfers that require processing both sides of a transfer instrument.

The encoded component is generated by a code generator software service or application that converts alphanumeric inputs into the applicable encoding format, such as a bar code, a QR code, a hologram, an image, or another suitable encoded format. Code generators come in a variety of types and are known to those skilled in the art. The encoded component may be properly encoded with provider security features, such as verification codes or encrypted data, that ensure only the source provide or the target provider enterprise can decode the transfer data.

The transfer instrument is created and stored in a PDF file format or an image file format, such as a JPEG compliant format, a TIFF format, a bitmap format, or a SVG image format. In some embodiments, the user can select a format to generate the transfer instrument as well as a method to receive the transfer instrument, such as receiving a hardcopy through the mail. User can be provided with an option to download the transfer instrument from a provider website or mobile software app, or an option to receive ng an electronic copy of the transfer instrument through email. The user can select a print function to generate a hardcopy of the transfer instrument. In response to the print function selection, the user computing device communicates with an associated printer to produce the hardcopy.

If the transfer instrument is provided to a user in an electronic format, the transfer instrument can be expediently transmitted to a target user computing device or enterprise computing device that is to receive the transfer using email, instant messaging, or other electronic communication methods that permit electronic file transfers. The target user computing device that receives the transfer instrument has the capability of scanning the encoded component using a camera or a QR code reader to verify the transfer data elements, such as a source identification, resource value.

Establishing Electronic Augmentations

Prior to initiating an electronic transfer, users establish electronic augmentations that can be applied to digitized transfer instruments. User computing devices establish a secure communication session with the provider computing system that authenticates the user identity and the user computing device, which can be preregistered with, and known to, the provider system. Users navigate a series of GUIs to view and edit user product settings and information, communicate with the provider, and initiate electronic transfers, among other functions. The products can be an account, such as a checking account, savings account, credit card account, loan account, or brokerage account, among other types of provider services and products. Users can be associated with one or more provider products, such as a user that has multiple accounts established with a provider. Conversely, each product can be associated with multiple users, such having multiple users authorized to use a single product or account.

Users can establish one or more distinct electronic augmentations and permissions for each product. The electronic augmentations and permissions define, for example: (i) the identity of users that are authorized to initiate or approve a resource transfer for each product; (ii) transfer instructions for processing a resource transfer; and (iii) the particular transfer instructions that each user is permitted to authorize.

The transfer instruction data defines particular actions taken when processing an electronic transfer of resources. Transfer instruction data can include, without limitation, instructions specifying: (i) a product identification for an account that will receive resources being electronically transferred; (ii) restrictions on the transfer destination, such as a "for deposit only" instruction that requires the entire amount or value of the resources being electronically transferred to be deposited into a single account associated with a specified product identification; (iii) that the resources being electronically transferred should be directed to a third party, such as a "pay to the order of" instruction; or (iv) that the transfer is directed to a particular beneficiary or for a dedicated purpose, such as a "for the benefit of" instruction whereby the electronic transfer is directed to a specified third party account and to be used for a named third party or purpose.

The utility of being able to establish multiple distinct, electronic augmentations that are applied in a consistent manner is illustrated with the following simplified, non-limiting examples. In a commercial context, a business might have a brand name or a "doing-business-as" ("d/b/a") name that is different from the name of the juristic legal entity under which the business operates, such as a restaurant called "Patrick's Patties" that operates under a juristic business entity named "Patrick Family Restaurants, LLC." The business might have multiple accounts with a provider that are each titled in the juristic entity name. Further, each account can have different authorized users, such as a first "owner" account having the business owner as the only authorized user and a second "operating" account having two managerial employees as authorized users.

In the above example, third parties might regularly initiate transfers through prepared transfer instruments that specify "Patrick's Patties" (i.e., the "d/b/a" name) as the transfer recipient even though the accounts are titled under the name "Patrick Family Restaurants, LLC" (i.e., the juristic entity name). When processing a transfer instrument, a provider is often not able to determine the proper recipient if the recipient named in the transfer instrument does not match how an account is titled. Moreover, when utilizing conventional marking techniques, some users such as the managerial employees in the foregoing example, might not appreciate that business accounts are titled under a different name than the d/b/a name specified in the transfer instrument. Thus, to ensure transfers are properly routed, standardized electronic augmentations can be established that specify the transfer recipient as "Patrick Family Restaurant, LLC d/b/a Patrick's Patties"—i.e., a marking that links the recipient named in the transfer instrument to the name in which the provider products or accounts are titled. The standardized electronic augmentations are automatically applied to the transfer instruments thereby reducing or eliminating potential errors when identifying the transfer recipient within a marking or electronic augmentation.

As a further example, the above business can establish at least two standardized electronic augmentations corresponding to the two accounts. That is, a first electronic augmentation for the owner account can include a product identifier associated with the owner account, and a second electronic augmentation can include a product identifier that is associated with the second, operating account. When applying electronic augmentations to the transfer instrument, a user can apply an electronic augmentation that specifies the desired destination account or provider protect.

To establish one or more electronic augmentations, users navigate to a Augmentation Settings GUI that receives augmentation settings data from users that is used to create electronic augmentations. Augmentation settings data can include, without limitation: (i) digital signature data, which can be an image of a handwritten marking or a series of alphanumeric characters or symbols used to identify an user and that serve as a user authorization input; (ii) a target product identification (e.g., an account number or name to receive the electronic transfer); (iii) user contact data, such as a mailing address, a geographic region designating the user's principal location (e.g., a zip code, city, state), an email address, or telephone number; (iv) authorized user identification data, such as a name, user name, or identification number that identifies users authorized to apply electronic augmentations; (v) role data indicating the actions an user is permitted to take, such as applying certain electronic augmentations that contain transfer instructions; (vi) transfer instruction data that designates how an electronic transfer should be processed; and (vii) marking instruction data that can establish restrictions and rules for how electronic augmentations are applied to a transfer instrument, such as applying a particular electronic augmentation to transfer instruments originating from a particular transfer source identification.

The augmentation settings data is used to generate electronic augmentation data that is used to generate the electronic augmentation. The electronic augmentation data is converted to human-readable text that includes letters and numbers or symbols, such as names, addresses, or product identification numbers. The augmentation data is converted to a human-readable alphanumeric text or symbols by, for instance, mapping alphanumeric characters in the augmentation marking data to matrices of pixels that represent an image of the character to be rendered on a display device. That is, the augmentation data might include a data representing a "1" or the letter "A," and the system accesses a set of standard character pixel matrices to output a human-readable character in a particular font or size.

In other cases, the electronic augmentation data is converted to images for display, such as a digital signature in script format, an enterprise or individual logo, or a security feature such as a hologram, a bar code, or a quick response ("QR") code. The electronic augmentation data can include, without limitation: (i) digital signature data; (ii) a target product identification; (iii) user contact data; (iv) authorized user identification data; (v) transfer instruction data; or (vi) image data representing a logo, symbol, barcode, or QR code.

In some embodiments, the augmentation data can be determined in whole or in part from data input by the user at or near the time the transfer instrument is digitized. To illustrate, a user can select an "initiate transfer" input function on a GUI displayed on a user computing device. Selecting the initiate transfer function can display a GUI that prompts the user to enter transfer data or augmentation data, such as a product identifier or transfer instruction data. In this manner, a user can determine at the time of the electronic transfer which account will receive the transfer, and the augmentation marking data can be generated accordingly to include the proper product identification data and transfer instruction data.

The augmentation data can be applied to an electronic transfer instrument by, for example, creating metadata that is appended to the file(s) representing the transfer instruments. Or alternatively, the augmentation marking data can be used to create a separate metadata file that is associated with the file(s) representing the electronic transfer instruments.

The electronic augmentation can be rendered as being overlaid on the transfer instrument image either prior to capturing an image or after the image is captured. That is, while a user is positioning the camera relative to the transfer instrument in preparation for capturing a still image, the user or terminal computing device display can render a continuous stream of dynamic image data showing the transfer instrument (i.e., a video). The continuous image stream can be augmented with the electronic augmentation along with the visual guide discussed above. In this manner, the user can review the accuracy of the augmentation marking data while at the same time position the electronic augmentation on the transfer instrument in a manner that does not interfere with content on the transfer instrument.

After the user selects an image capture input function to generate a still image, the computing device can display the still image of the transfer instrument with the electronic augmentation overlaid on the transfer instrument and appearing to be part of, or printed on, the transfer instrument. Thus, the user has another opportunity to review the accuracy and position of the electronic augmentation prior to authorizing the electronic transfer.

Initiating Electronic Transfers and Capturing Image Data

An example process for initiating and authorizing an electronic transfer is shown in FIG. 2. The user may receive one or more hardcopy or digital transfer instruments from third party transfer sources. The transfer instruments include transfer data that is processed by the provider to execute a transfer of resources from the third party transfer source to the user. The transfer instrument is reviewed, processed, and authorized by a user prior to initiating the transfer. Processing the transfer instrument includes performing operations that decode and validate the transfer data and apply electronic augmentations that serve as a transfer authorization and that includes transfer instruction data used by the provider to implement the transfer.

The user initiates and authorize a transfer by first launching a software application, such as a Provider Interface Application, that establishes a secure connection to the provider system. The user computing device generates one or more GUIs, such as the GUI shown in FIG. 3 that include input functions selectable by users, such as pull down menus, radio buttons, or text boxes. Users select an initiate mobile transfer function to begin the process of executing a transfer and creating an electronic transfer instrument.

Users enter augmentation input selection data into augmentation input functions (e.g., text boxes, pull-down menus, etc.) to enter transfer data or augmentation data prior to digitizing the transfer instrument. For example, the user computing device can display a GUI with one or more input fields, such as: (i) a user identification input field; (ii) a target product identification input field (i.e., an account to receive the transfer); (iii) a transfer value data input field; (iv) an transfer instruction data input field; and (v) other elements of transfer data that can be entered manually and used for, among other purposes, verifying transfer data that is automatically detected on the electronic transfer instrument.

At least one of the GUIs includes an image capture input function, such as the Image Capture button shown in FIG. 4. Selecting the image capture input function causes the user computing device to activate a digital camera or "image source" to capture an image that is used to digitize the transfer instrument. The transfer instrument can be digitized with the user computing device by, for example, capturing one or more images or capturing a video of the transfer instrument using the digital camera.

In other embodiments, image sources other than cameras can be used, such as electronic document scanners that generate transfer instrument content data as an image file, PDF file, or other digitized format. Each transfer instrument content file, or source image data, can depict a different portion or side of the transfer instrument (e.g., front and back) to capture all available transfer data for conversion to a digital format. In other embodiments, the transfer instrument is read with a code reader device that emits light that is reflected from the encoded component of the transfer instrument where the pattern of reflected light is used to decode the transfer data. The camera, other image source device, or code reader device can be integrated with the user computing device or connected as a separate device, such as a scanner or a portable digital camera that is in signal communication with the user computing device through a USB or other suitable cable or through a wireless connection, such Bluetooth® or NFC.

The image source device generates source image data that is processed by one or more software applications integrated with the user computing device, such as an Image Processing Module. The source image data is processed to implement functions that include, without limitation: (i) performing a content recognition analysis that determines the transfer data included within the transfer instrument through techniques such as optical character recognition ("OCR"); (ii) performing a feature recognition analysis to determine characteristics of the transfer instrument, such as physical dimensions or boundary edge locations; (iii) a segment analysis that determines various components of the transfer instrument image and identifies elements of transfer data within the transfer instrument; (iv) rendering electronic augmentations as an overlays on displayed images of the transfer instrument; (v) performing an electronic augmentations integration operation that associates, correlates, integrates, or appends the augmentation data with or to the transfer instrument content data for later processing by the provider; and (vi) performing image enhancement operations to improve accuracy of human or machine reading of the transfer instrument, such as sharpening the image, de-skewing the image, de-speckling the image, reorienting the image, de-warping the image, converting the image to greyscale or black-and-white colorization (i.e., binarization), or adjusting the color, among other functions.

The transfer instrument content data, or source image data, can be static image data, such as when the camera captures a photographic image of the transfer instrument at an instant in time. The source image data can also be dynamic image data where the camera generates a continuous feed of image data (i.e., sequential static image frames) rendered on a display device that is integrated with the user computing device (i.e., a video stream depicting the transfer instrument displayed on a touch screen). Providing a continuous stream of dynamic image data allows the user to align the camera with the transfer instrument before capturing an image. Better alignment of the camera and the transfer instrument helps ensure that the augmentation content data represents a more accurate and complete depiction of the transfer instrument, including any transfer data within the transfer instrument.

When capturing an image, the user computing device display can be configured to render a visual guide, such as a box, outline, or partial corners of a rectangle shown in FIG. 4. Users align the visual guide with the transfer instrument shown on the computing device display, such as placing the transfer instrument within the visual guide, before selecting an image capture function to generate source image data representing a still image of the transfer instrument. The visual guides help ensure optimal orientation of the transfer instrument, including the encoded component, within the image and also help ensure that the camera is an optimal distance from the transfer instrument.

Optimizing the distance between the camera and the transfer instrument results in the transfer instrument occupying a desired proportion of the overall image size, such as locating the edges of the transfer instrument a pre-determined number of pixels away from each side boundary of the image. The system can then more efficiently crop the image to eliminate pixels that are located near the boundaries of the image and outside the edges of the transfer instrument. Cropping the image reduces the size of the image data file for faster transmission over a network and eliminates potential background "noise" near the edges of the image that could interfere with subsequent image processing and possibly be mistaken for transfer data.

Any suitable edge detection techniques can be employed to determine the edges of the transfer instrument and to facilitate image cropping. Edge detection can be utilized both before and after capturing an image of the transfer instrument. Before capturing an image, if all edges of the transfer instrument are not detected within the image data, the user computing device can display a notification or an indicator to the user notifying the user that the entirety of transfer instrument might not be within the boundaries of the image. Similarly, if all edges of the transfer instrument are not detected within a captured image, the user computing device can display a notification to the user and prompt the user to capture a replacement image.

To perform edge detection, in one embodiment, an Image Processing Module software component first converts the image to black and white pixels with each pixel having position data (e.g., X-Y coordinates) and a brightness value indicating how light or how dark the pixel is to be displayed. The Image Processing Module analyzes adjacent rows and columns of pixels to determine abrupt changes in the brightness values that represent edges of the transfer instrument. The Image Processing Module can streamline the edge detection process by starting the analysis at locations where edges are expected, such as positions proximal to the visual guide locations or positions located a certain number of pixels away from the edge of the image.

In one example of edge detection, three locations where edges are expected are examined to find a top left corner, a top right corner, and a bottom edge of the transfer instrument. For each of the corners or edges that are detected, a byte array is created, a histogram of the array is generated, and a binary black-and-white image is generated so that a horizontal line can be found for each of the top left corner, top right corner, and bottom edge. Similar operations are used to determine a vertical line for the top left and right corners. Following edge detection, the Image Processing Module can analyze the image data to ensure that the entire transfer instrument was captured within the image boundaries.

The user computing device or provider terminal that is being used to capture the image can also utilize anti-motion techniques to help ensure the image source device or camera is steady as images of the transfer instrument are captured. The result is a more sharp and more clear image. Any suitable anti-motion techniques can be utilized. In one example embodiment, an edge detection analysis is performed on successive image frames captured by the camera (e.g., every frame, every other frame, or every "x" number of frames to reduce processing requirements). If the edge detection analysis indicates that the locations of transfer instrument edges change by a predetermined threshold from one frame to the next (e.g., change by more than "x" number of pixels), the change is interpreted as unacceptable camera movement that could result in a poor image quality. The user computing device can then disable the image capture input function until movement falls within acceptable limits or display a notification to the user that camera movement should be eliminated as the movement could result in reduced image quality.

In yet another embodiment, the user computing device can include an integrated accelerometer that outputs positional data at periodic intervals of time. Changes in the positional data above a certain threshold can be interpreted as unacceptable camera movement that could result in a poor image quality. Again, the user computing device can then disable the image capture input function until movement falls within acceptable limits (e.g., the position data does not change above a predetermined threshold for a predetermined amount of time), or the user computing device can display a notification to the user recommending that camera the movement be reduced.

Once an image is captured, the image data can be converted and/or stored in one or more suitable image data formats, such as a JPEG compliant format, a TIFF format, a bitmap format, or a SVG image format. In some embodiments, the camera device captures images in a first image data format, such JPEG, that is then converted to another format with a smaller file size to facilitate transmission of the image data between computing devices. The provider computing system may convert the image data representing the transfer instrument into a binary interchange format, such as the DSTU X9.37-2003 file format, prior to transmitting the digitized transfer instrument to a third party, such as an automated clearing house.

Those of skill in the art will recognize that capturing an image is not the only method available for digitizing a physical transfer instrument. In other embodiments, the transfer instrument can be digitized in whole or in part using a document scanner, by entering transfer data into a GUI, or using a code reader device to decode transfer data. In one example embodiment, transfer data is decoded from an encoded component of a transfer image, and the system can generate file(s) that represent the transfer instrument, such as a data file (e.g., a .dat file), a hypertext language markup file (e.g., a html or xml file), a comma-separated value file (e.g., a .csv file), a portable document format file (e.g., a PDF file), or a template/standardized image representing a transfer instrument (e.g., a JPEG or TIFF image resembling generic check).

A hybrid of digitization methods can be used where, for example, a transfer instrument includes one or more encoded component and one or more non-encoded components. Image data that includes an image of an encoded component is processed to decode the transfer data, and image data from the non-encoded components is processed using a content recognition analysis, natural language processing, and transfer data extraction techniques to determine transfer data, as described above.

In other cases, a hybrid digitization approach is used where not all of the transfer data can be determined by analyzing an image of the transfer instrument. In that case, the computing device display can generate and show a notification to the user stating that one or more elements of the transfer data could be not determined from the image if, for example, the transfer instrument is folded or damaged in a manner that conceals transfer data or handwritten transfer data is of poor quality and cannot be read. The computing device can also render a GUI that allows the user to input missing transfer data.

The system (i.e., a user computing device, provider terminal computing device, or a provider network computing device) can process source image data using a content recognition analysis to conduct an initial assessment regarding the quality of a digital image showing a transfer instrument. In particular, the initial assessment can determine readability of the transfer data contained on the transfer instrument. For example, the system can determine whether the product identification, the transfer value data, or other transfer data is readable such that it may be parsed or otherwise obtained and processed by the provider to execute the transfer. The initial quality assessment can be performed after a user captures all required images of the transfer instrument.

If the quality is confirmed, the user is prompted to confirm that the transaction is authorized and that electronic augmentations applied to the image are correct. Alternatively, the initial quality assessment can be performed after a first image of the transfer instrument is generated (i.e., a front side of the transfer instrument), and if the quality is confirmed as acceptable, the user computing device can generate a prompt instructing the user to capture a subsequent image of the transfer instrument (e.g., the back side of the transfer instrument).

While receiving a continuous video feed of dynamic image data, the user computing device captures single, static image of the transfer instrument in response to user selection of an input function that causes the user computing device to store a single frame of image data to transitory or non-transitory storage. The edge detection, content recognition, initial quality assessment, and enhancement operations (discussed below) are used to process static image data. The user can be required to capture multiple static images of a transfer instrument to ensure all the relevant transfer data is captured for generating the electronic transfer instrument.

Those of skill in the art will appreciate that other measures of image data quality can be used, such as determining the sharpness (i.e., contrasts in brightness between adjacent groups of pixels) or noise (i.e., random variations in brightness or color information) in the image data and only accepting images having predetermined thresholds for acceptable sharpness or noise. In this manner, the image quality assessment ensures that the image data is sufficient to permit transfer data to be extracted from the non-encoded components and that transfer data can be read from the encoded components.

In some cases, the image data may include significant levels of noise that interferes with reading transfer data. Noise reduction techniques can be applied to facilitate decoding and extraction of transfer data. Noise in digital images can include, without limitation, Gaussian noise, Rayleigh noise, salt and/or pepper noise, and impulse noise, among other types. Noise detection analyzes the color, brightness, or other properties of a pixel as compared to nearby pixels where pixels having characteristics that vary significantly compared to nearby pixels are taken as noise. When one or more images satisfying the image data quality threshold are captured an stored, the one or more images meeting the image data quality thresholds are then stored to the user computing device memory for use in creating the electronic transfer instrument.

Noise reduction techniques can include running an edge adaptive spatial low pass filter over an image while using an edge detector to protect some of the edge boundaries. Another way to improve signal to noise ratios ("SNR") is by temporally combining matching parts from two or more images by applying a temporal filter (e.g. a Motion Compensated Temporal Filtering). Gaussian noise reduction techniques can include mean filtering or Wiener filtering. Non-linear filters, such as median filtering and weighted median filtering, suppress noise without any identification. Bilateral filtering is a non-linear, edge-preserving, and noise-reducing smoothing technique that replaces the intensity value of each pixel with a weighted average of intensity values from nearby pixels. Spatial noise reduction techniques can include total variational regularization, non-local regularization, sparse representation, and low rand minimization techniques.

Transform domain de-noising techniques first transform the given noisy image to another domain, and then they apply a de-noising procedure on the transformed image according to the different characteristics of the image and its noise. Transform domain techniques include, without limitation, independent component analysis and MB3D. Neural networks can also be used for noise reduction where optimization techniques are employed, such as use of convolutional neural networks, multi-layer perception models, or deep learning networks.

The system utilizes content recognition techniques to detect and convert image data to content elements, such as individual characters, letters, numbers, symbols, or images within the transfer instrument to ensure the transfer data can be read. That is, within the image data, the system discerns and identifies individual characters. The system then utilizes a segment analysis to group content elements by transfer instrument component so various elements of the transfer instrument can be identified, such as recognizing the product identification, routing data, or transfer value data whether handwritten or typed.

The segment analysis alone or in combination with an edge detection analysis can also extract known features of the transfer instrument associated with components of the transfer instrument. In one embodiment, the visual guide shown in FIG. 4 is used to ensure that a transfer instrument is centered near a particular location within image data at the time of image capture. The provider system is programed with an expected location for an encoded component, such as proximal to, or within a certain number of pixels from, a lower, right corner of a transfer instrument image, or within a certain number of pixels from the center of a transfer instrument image. The system then analyzes pixels proximal to the expected location to recognize matrices of pixels corresponding to the finder pattern on a QR code or other encoded component. Once the finder pattern and QR code are located, the location of the encoded component is determined and stored as map index data.

In another example, where the text string "pay to the order of" is known to always be on a front or first side of the transfer instrument, the system analyzes each frame of image data to detect that particular string. When detected, the system recognizes that the frame of image data represents the front or first side of the transfer instrument. As another example, in some cases it is known that the text string "endorse here" always appears on the rear, or second, side of the transfer instrument such that when that text is recognized, the system designates the image data as representing the second side of a transfer instrument.

Transfer Instrument Security and Validation

The system can perform an error detection analysis to detect potential errors in the transfer data. For example, the system might determine that the source identification data has a value of "customer 1" and the transfer value data yields a value of "$10." The user computing device can display a GUI that prompts the user to enter expected source identification data and expected transfer value data. The system compares the expected values against the values determined through the content recognition analysis or decoding of the encoded regions. A match between the user-entered expected data values and the determined data values is taken as an indicator that the transfer data was properly determined through the content recognition analysis or through decoding the encoded regions. If the expected data values and the determined data values do not match, the transfer can be automatically terminated, or the user can be notified and prompted to confirm whether the transfer is still authorized.

The error detection analysis can also provide a measure of security and accuracy by validating data determined from decoding the encoded components of a transfer instrument and from extracting transfer data using the content recognition analysis, segment classification, and transfer data extraction. The decoded or extracted transfer data is compared against known data stored to a provider system. One example includes verifying the user identification or product identification for the electronic transfer recipient or account. A user computing device accepts authentication data, such as a user name, password, PIN code, or biometric data that is transmitted to a provider with system configuration data to verify the user and device and to determine an user identification.

Following the verification analysis, some embodiments retrieve additional elements of end user data that can be verified against transfer data or augmentation data included as part of an electronic transfer instrument. The provider system can include an end user database that stores end user data. After capturing an image of a transfer instrument, the system compares the user identification determined as part of the verification analysis to the transfer data on the transfer instrument, such as a user identification adjacent to a content element string "pay to the order of." If the user identifications match, or if the user identification on the transfer instrument matches a known co-authorized user identification, the system proceeds with creating an electronic transfer instrument. If the user identification do not match, the system can display a notification to the user indicating that the user identification could not be validated. The system can provide users with the option to acknowledge the notification and proceed with the transaction, or the system can deny the transaction and terminate the process of creating the electronic transfer instrument.

The system can also compare augmentation data against known end user data, such as comparing a user identification determined by the provider identity management service against user identification data include in the augmentation data. This can be useful where, for example, the augmentation is generated by conventional techniques and is a handwritten or stamped "endorsement" on the transfer instrument. In that case, the augmentation is not generated electronically from known data. The augmentation includes a signature, address, name, transfer instructions, and a product identification. The user computing device performs a content recognition analysis to determine the characters that comprise the augmentation or "endorsement." The segment classification analysis and transfer analysis identify the symbols, or images within the augmentation as comprising an user identification, a signature, user contact data, a product identification, or transfer instruction data. The information from the augmentation is then compared against a known user identification, digital signature, product identification, contact information, user contact data, or the like that is stored to the provider system. In this manner, the information on the endorsement or augmentation can be validated prior to transmitting the electronic transfer instrument to a third party for processing.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A system for processing encoded transfer instruments comprising:
   a first computer including a first processor and a first memory device storing executable code;
   a target computer including a second processor, an integrated display device, and a second memory device storing additional executable code; and
   a camera electrically coupled with the target computer;
   wherein, when executed, the executable code causes the first processor to:
   (a) display an initiate transfer graphical user interface (GUI) that comprises one or more initiate transfer input functions that accept inputs from a first end user, wherein the inputs by the end user are used to generate input transfer data elements that comprise target identification data and transfer value data, and signature data;
   (b) convert the input transfer data elements to an encoded component;
   (c) generate a first transfer instrument image comprising the encoded component and content data elements that represent human-readable text characters, wherein the first transfer instrument image is sized to fit on a single side of a bank check;
   (d) transmit the first transfer instrument image to the target computer, wherein executing the additional executable code causes the second processor to:
      (i) receive the first transfer instrument image,
      (ii) activate the camera electrically coupled with the target computer, wherein the camera captures image data that comprises a second transfer instrument image, and wherein the second transfer instrument image comprises a transfer instrument having an encoded component image,
      (iii) detect edge boundaries for the transfer instrument in the second transfer instrument image,
      (iv) read and convert a portion of the image data to the content data elements to detect the text characters on the second transfer instrument image,
      (v) segment the second transfer instrument image into the encoded component image and at least one non-encoded component, wherein the non-encoded component comprises the content data elements,
      (vi) decode the encoded component image into transfer data elements,
      (vii) extract at least one of the transfer data elements from the second transfer instrument image by converting groups of content data elements to an extracted transfer data element,
      (viii) generate an electronic augmentation using augmentation input data entered by a target end user into an augmentation GUI prior to receiving the first transfer instrument image,
      (ix) apply the electronic augmentation input data to the second transfer instrument image, wherein (A) the electronic augmentation is displayed by the target computer as overlaid on the second transfer instrument image, and (B) the electronic augmentation, the encoded component, and the non-encoded component are displayed on a single side of the second transfer instrument image, and
      (x) create an electronic transfer instrument that comprises the decoded transfer data element, the extracted transfer data element, and the electronic augmentation.

2. The system for processing encoded transfer instruments of claim 1, wherein the electronic augmentation is a bar code or a quick response code.

3. The system for reading encoded transfer instruments of claim 1, wherein the electronic augmentation comprises transfer instructions and target identification data.

4. The system for processing encoded transfer instruments of claim 1, wherein the encoded component comprises a bar code or a quick response code.

5. The system for processing encoded transfer instruments of claim 1, wherein transmitting the first transfer instrument image to the target computer comprises transmitting the first transfer instrument image through email.

6. The system for processing encoded transfer instruments of claim 1, wherein the encoded component comprises a hologram.

7. The system for processing encoded transfer instruments of claim 1, wherein:
   (a) the first memory device comprises a decryption key;
   (b) the encoded component comprises an encrypted transfer data element; and
   (c) decoding the encoded component comprises decrypting the encrypted transfer data element using the decryption key.

8. The system for processing encoded transfer instruments of claim 1, wherein:
   (a) the system further comprises a mobile software application running on the first computer and the target computer;
   (b) the mobile software application performs the operation of transmitting the first transfer instrument image to the target computer; and
   (c) transmitting the first transfer instrument image comprises transmitting the first transfer instrument image through the mobile software application.

9. The system for processing encoded transfer instruments of claim 1, wherein:

(a) the decoded transfer data element comprises a target identification; and wherein
(b) the executable code, when executed, further causes the first processor to
  (i) transmit system configuration data to a network computer that compares the system configuration data to stored system configuration and returns end user data, wherein the end user data comprises an user identification, and
  (ii) detects errors with the target of the electronic transfer instrument by comparing the target identification to the user identification.

10. The system for processing encoded transfer instruments of claim 1, wherein, prior to creating the electronic transfer instrument, the second processor enhances the transfer instrument image using one or a combination of de-skewing, de-warping, or de-speckling the transfer instrument image.

11. The system for processing encoded transfer instruments of claim 1, wherein
(a) the target computer transmits system configuration data to a network computer that compares the system configuration data to stored system configuration and returns end user data, wherein the end user data comprises an authorized user identification; and
(b) the target computer generates the electronic augmentation based on the authorized user identification.

12. The system for processing encoded transfer instruments of claim 1, wherein the electronic augmentation comprises transfer instructions and a product identification selected by a target end user based on target end user role data.

13. A system for processing encoded transfer instruments comprising:
a first computer including a first processor and a first memory device storing executable code;
a target computer including a second processor, an integrated display device, and a second memory device storing additional executable code; and
a camera electrically coupled with the target computer;
wherein, when executed, the executable code causes the first processor to:
(a) accept inputs from a first end user, wherein the inputs by the end user are used to generate input transfer data elements;
(b) convert the input transfer data elements to an encoded component;
(c) generate a first transfer instrument image comprising the encoded component, wherein the first transfer instrument image is sized to fit on a single side of a bank check; and
(d) print the first transfer instrument image to a hardcopy transfer instrument, wherein
  (i) the hardcopy transfer instrument is physically presented to a target end user,
wherein, when executed, the additional code causes the second processor to:
  (A) in response to input from the target end user, activate the camera electrically coupled with the target computer, wherein
    (i) the camera captures an image of the hardcopy transfer instrument that is used to generate image data comprising a second transfer instrument image, and
    (ii) the second transfer instrument image comprises an encoded component image;
  (B) receive the second transfer instrument image from the camera,
  (C) detect edge boundaries for the image of the hardcopy transfer instrument, in the second transfer instrument image,
  (D) segment the transfer instrument image to detect the encoded component image,
  (E) decode the encoded component image into a plurality of transfer data elements,
  (F) generate an electronic augmentation using augmentation input data entered by the target end user into an augmentation GUI,
  (G) apply the electronic augmentation input data to the image of the hardcopy transfer instrument, wherein (I) the electronic augmentation is displayed by the target computer as overlaid on the image of the hardcopy transfer instrument, and (II) the electronic augmentation and the encoded component are displayed on a single side of the image of the hardcopy transfer instrument; and
  (H) create an electronic transfer instrument that comprises the image of the hardcopy transfer instrument and the extracted transfer data elements.

14. The system for processing encoded transfer instruments of claim 13, wherein:
(a) the encoded component comprises a two-dimensional pattern;
(b) the two-dimensional pattern further comprises a plurality of modules; and
(c) each of the modules is one of a square, a rectangle, or a circle.

15. The system for processing encoded transfer instruments of claim 14, wherein the encoded component comprises a quick response code.

16. The system for processing encoded transfer instruments of claim 14, wherein the transfer data elements comprises transfer value data and source identification data.

* * * * *